(12) United States Patent
Kim et al.

(10) Patent No.: US 8,891,354 B2
(45) Date of Patent: *Nov. 18, 2014

(54) METHOD FOR MULTIPLEXING DATA AND CONTROL INFORMATION

(71) Applicant: LG Electronics Inc., Seoul (KR)

(72) Inventors: Ki Hwan Kim, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,763

(22) Filed: Mar. 8, 2013

(65) Prior Publication Data

US 2013/0182670 A1 Jul. 18, 2013

Related U.S. Application Data

(63) Continuation of application No. 13/291,995, filed on Nov. 8, 2011, now Pat. No. 8,547,923, which is a (Continued)

(30) Foreign Application Priority Data

Aug. 28, 2008 (KR) .................. 10-2008-0084616
Aug. 28, 2008 (KR) .................. 10-2008-0084617

(51) Int. Cl.
*H04J 11/00* (2006.01)
(Continued)

(52) U.S. Cl.
CPC ............. *H04W 72/04* (2013.01); *H04L 1/1607* (2013.01); *H04L 5/0053* (2013.01); *H04L 5/0044* (2013.01); *H04L 1/0026* (2013.01); *H04L 5/0007* (2013.01); *H04L 1/0075* (2013.01)

USPC .......... 370/208; 370/329; 370/344; 370/252; 370/281; 375/260; 455/450; 455/452.2; 714/748; 714/749

(58) Field of Classification Search
None
See application file for complete search history.

(56) References Cited

U.S. PATENT DOCUMENTS 5,771,223 A 6/1998 Kimura et al.
6,956,842 B1 10/2005 Okumura et al.
(Continued)

FOREIGN PATENT DOCUMENTS

CN 1239637 12/1999
CN 1304581 7/2001
(Continued)

OTHER PUBLICATIONS

Samsung et al., "Multiplexing of Rank and CQI/PMI in PUSCH Channel", R1-082087, 3GPP TSG-RAN Working Group 1 #53, May 2008, 4 pages.

(Continued)

*Primary Examiner* — Candal Elpenord
(74) *Attorney, Agent, or Firm* — Lee, Hong, Degerman, Kang & Waimey

(57) ABSTRACT

A method for multiplexing a data information stream, including a systematic symbol and a non-systematic symbol, and a control information stream of at least three types in a wireless mobile communication system is disclosed. The method includes mapping the data information stream to a resource area so that the systematic symbol is not mapped to a specific resource area to which the control information stream is mapped, and mapping the control information stream to the specific resource area.

20 Claims, 21 Drawing Sheets

Related U.S. Application Data continuation of application No. 12/395,544, filed on Feb. 27, 2009, now Pat. No. 8,094,639.

(60) Provisional application No. 61/032,412, filed on Feb. 28, 2008, provisional application No. 61/035,054, filed on Mar. 10, 2008, provisional application No. 61/036,066, filed on Mar. 12, 2008, provisional application No. 61/041,929, filed on Apr. 3, 2008, provisional application No. 61/041,973, filed on Apr. 3, 2008, provisional application No. 61/047,404, filed on Apr. 23, 2008, provisional application No. 61/048,297, filed on Apr. 28, 2008, provisional application No. 61/126,326, filed on May 1, 2008, provisional application No. 61/050,732, filed on May 6, 2008, provisional application No. 61/051,398, filed on May 8, 2008, provisional application No. 61/060,126, filed on Jun. 10, 2008.

(51) Int. Cl.
*H04W 72/04* (2009.01)
*H04W 72/06* (2009.01)
*H04B 7/208* (2006.01)
*H04L 5/00* (2006.01)
*H04L 1/16* (2006.01)
*H04L 1/00* (2006.01)

(56) References Cited

U.S. PATENT DOCUMENTS

| | | | |
|---|---|---|---|
| 7,127,004 | B1 | 10/2006 | Sonning et al. |
| 7,327,718 | B2 | 2/2008 | Okumura et al. |
| 7,477,698 | B2 | 1/2009 | Vummintala et al. |
| 7,525,988 | B2 | 4/2009 | Kim |
| 7,672,401 | B2 | 3/2010 | Mysore et al. |
| 7,839,835 | B2 | 11/2010 | Khojastepour et al. |
| 7,885,211 | B2 | 2/2011 | Shen et al. |
| 7,903,575 | B2 | 3/2011 | Yoon et al. |
| 7,961,640 | B2 | 6/2011 | Prakash et al. |
| 8,041,362 | B2 | 10/2011 | Li et al. |
| 8,154,983 | B2 * | 4/2012 | Zhang et al. ............... 370/208 |
| 8,165,075 | B2 | 4/2012 | Han et al. |
| 8,249,043 | B2 | 8/2012 | Chauviere et al. |
| 8,400,978 | B2 * | 3/2013 | Kim et al. ............... 370/330 |
| 2004/0213183 | A1 | 10/2004 | Barry et al. |
| 2006/0107171 | A1 | 5/2006 | Skraparlis |
| 2007/0097981 | A1 | 5/2007 | Papasakellariou |
| 2007/0171849 | A1 | 7/2007 | Zhang et al. |
| 2008/0095050 | A1 | 4/2008 | Gorokhov et al. |
| 2008/0095109 | A1 | 4/2008 | Malladi et al. |
| 2008/0141093 | A1 | 6/2008 | Kwon et al. |
| 2008/0144733 | A1 | 6/2008 | ElGamal et al. |
| 2008/0233966 | A1 | 9/2008 | Scheim et al. |
| 2008/0260058 | A1 | 10/2008 | Li |
| 2008/0267138 | A1 | 10/2008 | Walton et al. |
| 2008/0267158 | A1 * | 10/2008 | Zhang et al. ............... 370/342 |
| 2008/0298224 | A1 | 12/2008 | Pi et al. |
| 2009/0046582 | A1 | 2/2009 | Sarkar et al. |
| 2009/0073922 | A1 * | 3/2009 | Malladi et al. ............... 370/328 |
| 2009/0086648 | A1 | 4/2009 | Xu et al. |
| 2009/0201825 | A1 | 8/2009 | Shen et al. |
| 2009/0207784 | A1 * | 8/2009 | Lee et al. ............... 370/328 |
| 2009/0304048 | A1 | 12/2009 | Gunter |
| 2010/0197302 | A1 | 8/2010 | Chen et al. |
| 2011/0149717 | A1 | 6/2011 | Dai et al. |
| 2012/0051311 | A1 | 3/2012 | Kim et al. |
| 2012/0063346 | A1 | 3/2012 | Khojastepour |

FOREIGN PATENT DOCUMENTS

| | | |
|---|---|---|
| EP | 1501228 | 1/2005 |
| JP | 2007-037178 | 2/2007 |
| JP | 2007-142944 | 6/2007 |
| JP | 05-155414 B2 | 3/2013 |
| KR | 10-2008-0035424 | 4/2008 |
| KR | 10-2008-0095712 | 10/2008 |
| TW | 2007-31716 | 8/2007 |
| WO | 2006/130541 | 12/2006 |
| WO | 2009/041419 | 4/2009 |

OTHER PUBLICATIONS

LG Electronics, "Multiplexing of Rank, CQI and Data in PUSCH", R1-081255, 3GPP TSG RAN WG1#52bis, Mar. 2008, 3 pages.
3rd Generation Partnership Project (3GPP); "Technical Specification Group Radio Access Network; Evolved Universal Terrestrial Radio Access (E-UTRA); Multiplexing and channel coding (Release 8)", 3GPP TS 36.212 V8.3.0, May 2008, pp. 28-30.
3rd Generation Partnership Project (3GPP); "Technical Specification Group Radio Access Network; Evolved Universal Terrestrial Radio Access (E-UTRA); Multiplexing and channel coding (Release 8)", 3GPP TS 36.212 V8.2.0, Mar. 2008, pp. 23-25.
3rd Generation Partnership Project (3GPP); "Technical Specification Group Radio Access Network; Evolved Universal Terrestrial Radio Access (E-UTRA); Multiplexing and channel coding (Release 8)", 3GPP TS 36.212 V8.1.0, Nov. 2007, pp. 21-29.
3rd Generation Partnership Project (3GPP), "Technical Specification Group Radio Access Network; Evolved Universal Terrestrial Radio Access (E-UTRA); Physical Channels and Modulation (Release 8)", 3GPP TS 36.211 V8.1.0, Nov. 2007, 5 pages.
U.S. Appl. No. 13/292,005, Notice of Allowance dated Nov. 27, 2012, 11 pages.
U.S. Appl. No. 13/291,995, Notice of Allowance dated Apr. 25, 2013, 12 pages.
Texas Instruments, "Separate Rank and CQI Feedback in PUCCH," 3GPP TSG RAN WG1 Meeting #52, R1-080708, Feb. 2008, 8 pages.
AH Chairman, "Summary of AH on AI 6.3.4 UE Procedures for downlink shared channel," 3GPP TSG RAN WG1 Meeting #52, R1-081137, Feb. 2008, 7 pages.
Samsung, et al., "Further Refinements on Rank Reporting," 3GPP TSG RAN WG1 52, R1-081116, Feb. 2008, 3 pages.
European Patent Office Application Serial No. 09153949.4, Search Report dated Nov. 29, 2013, 5 pages.

* cited by examiner

'1' → RS symbol period(0)
'2' → RS symbol period(1)
'3' → RS symbol period(2)
'4' → RS symbol period(3)
'1'+'2'+'3'+'4' → First symbol period ■ Resource element allocated for RS mapping

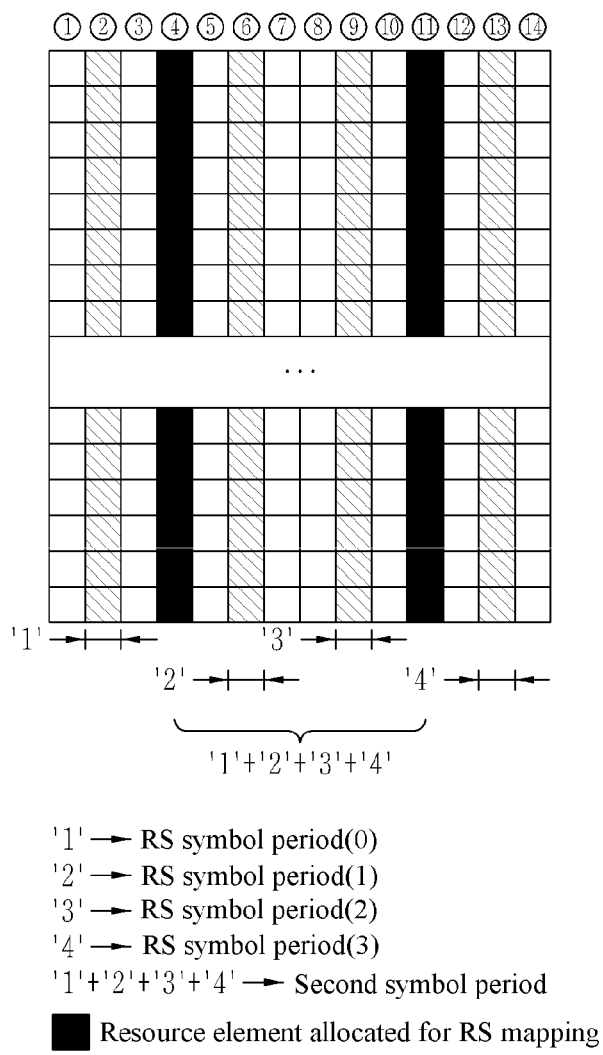

Forward mapping

Backward mapping

■ Resource element allocated for RS mapping

■ Resource element allocated for RS mapping

METHOD FOR MULTIPLEXING DATA AND CONTROL INFORMATION

CROSS-REFERENCE TO RELATED APPLICATIONS

This application is a continuation of U.S. patent application Ser. No. 13/291,995, filed on Nov. 8, 2011, U.S. Pat. No. 8,547,923, which is a continuation of U.S. patent application Ser. No. 12/395,544, filed on Feb. 27, 2009, now U.S. Pat. No. 8,094,639, which claims the benefit of earlier filing date and right of priority to Korean Patent Application Nos. 10-2008-0084616, filed on Aug. 28, 2008, and 10-2008-0084617, filed on Aug. 28, 2008, and also claims the benefit of U.S. Provisional Application Ser. Nos. 61/032,412, filed on Feb. 28, 2008, 61/035,054, filed on Mar. 10, 2008, 61/036,066, filed on Mar. 12, 2008, 61/041,929, filed on Apr. 3, 2008, 61/041,973, filed on Apr. 3, 2008, 61/047,404, filed on Apr. 23, 2008, 61/048,297, filed on Apr. 28, 2008, 61/126,326, filed on May 1, 2008, 61/050,732, filed on May 6, 2008, 61/051,398, filed on May 8, 2008, and 61/060,126, filed on Jun. 10, 2008, the contents of which are hereby incorporated by reference herein in their entirety.

BACKGROUND OF THE INVENTION

1. Field of the Invention

The present invention relates to a method for multiplexing data and control sequences and mapping the multiplexed sequences to a physical channel in a wireless mobile communication system.

2. Discussion of the Related Art

Data and control sequences transmitted from a media access control (MAC) layer to a physical layer are encoded and then provide transport and control services through a radio transmission link. A channel coding scheme is comprised of a combination of processes of error detection, error correction, rate matching, interleaving, and mapping of transport channel information or control information to the physical channel. Data transmitted from the MAC layer includes systematic bits and non-systematic bits according to the channel coding scheme. The non-systematic bits may be parity bits.

In the $3^{rd}$ generation partnership project (3GPP), an uplink shared channel (UL-SCH) and a random access channel (RACH) of an uplink transport channel may be mapped to a physical uplink shared channel (PUSCH) and a packet random access channel (PRACH) of a physical channel, respectively. Uplink control information (UCI), which is one of an uplink control channel information, may be mapped to a physical uplink control channel (PUCCH) and/or a PUSCH. A downlink shared channel (DL-SCH), a broadcast channel (BCH), a paging channel (PCH), and a multicast channel (MCH) of a downlink transport channel are respectively mapped to a physical downlink shared channel (PDSCH), a physical broadcast channel (PBCH), a physical downlink shared channel (PDSCH), and a physical multicast channel (PMCH) of a physical channel. A control format indicator (CFI), a hybrid automatic repeat request (HARQ) indicator (HI), and downlink channel information (DCI) of downlink control channel information are mapped to a physical control format indicator channel (PCFICH), a physical HARQ indicator channel (PHICH), and a physical downlink control channel (PDCCH) of a physical channel, respectively. The above transport channels are mapped to the respective physical channels through multiple processes. Especially, in a channel such as a UL-SCH, processing for cyclic redundancy check (CRC), code block segmentation, channel coding, rate matching, and code block concatenation is performed with respect to at least one transport channel or control information.

A process for processing a transport channel and/or control information is illustrated in FIG. 1. Data in the form of a transport block is input every transmission time interval (TTI). The transport block is processed as follows. A CRC attachment block attaches a CRC to the data in the form of a transport block. A code block segmentation block segments the CRC-attached data into one or more code blocks. A channel coding block performs channel coding for a code block data stream of each of the segmented code blocks. A rate matching block performs rate matching for the channel coded data stream. A code block concatenation block concatenates one or more rate-matched data streams to form a sequence of encoded data bits. Meanwhile, a separate channel coding block performs channel coding for control information to form a sequence of encoded control bits. A data/control multiplexing block multiplexes the sequence of encoded data bits and the sequence of encoded control bits, thereby generating a sequence of multiplexed bits.

One symbol may be comprised of at least one bit according to a modulation order (Qm). For example, for BPSK, QPSK, 16QAM, and 64QAM, one bit, two bits, four bits, and six bits corresponding respectively thereto constitute one symbol. In a system using single-carrier frequency division multiple access (SC-FDMA), one symbol is mapped to one resource element (RE), and therefore, a description can be given in units of symbols. Accordingly, the terms 'coded data bit', 'coded control bit', and 'multiplexed bit' may be replaced with the terms 'coded data symbol', 'coded control symbol', and 'multiplexed symbol', respectively, in consideration of the modulation order, for convenience of description. The terms 'coded data bit', 'coded data symbol', 'coded data symbol', 'coded control bit', and 'coded control symbol' may be abbreviated to 'data bit' data symbol', 'control bit' and 'control symbol', respectively, for convenience of description.

The control information may be classified into one or more types according to properties thereof and various multiplexing schemes may be considered according to the number of types.

If only one type of control information is present, when data information and control information are multiplexed, the control information may or may not overwrite the data information.

If two types of control information are present, the control information is divided into a first type of control information and a second type of control information. If the second type of control information is more important than the first type of control information, data information and control information may be multiplexed in a manner that the first type of control information overwrites or does not overwrite data information. Next, the second type of control information may or may not overwrite the multiplexed data information and/or the first type of control information.

A process of processing a transport channel for a UL-SCH of the 3GPP is illustrated in FIG. 2. FIG. 2 illustrates a matrix structure of 'R' rows by 'C' columns (R*C) (for example, C=14). Hereinafter, such a structure may be referred to as 'a set of resource elements'. C successive symbols are arranged in a time area in a horizontal direction and R virtual subcarriers are arranged in a frequency area in a vertical direction. In a set of resource elements, virtual subcarriers are arranged adjacent to each other but subcarriers on respective physical channels corresponding to the virtual subcarriers may be discontinuous in the frequency area. Hereinafter, the term 'virtual subcarrier' related to a set of resource elements will be referred to as 'subcarrier' for brevity. In a normal cyclic prefix structure ('normal CP structure'), 14 (C=14) symbols constitute one sub-frame. In an extended CP structure, 12 (C=12) symbols may constitute one sub-frame. That is, FIG. 2 is based on the normal CP structure. If the 'extended CP structure' is used, FIG. 2 may have a matrix structure in which C is 12. Referring to FIG. 2, M symbols (=the number of symbols per sub-frame×the number of subcarriers=C×R) may be mapped. Namely, M symbols may be mapped to M resource elements per one sub-frame. In addition to symbols generated by multiplexing data symbols and control symbols, reference signal (RS) symbols and/or sounding RS (SRS) symbols may be mapped to the M resource elements. Therefore, if K RS symbols and/or SRS symbols are mapped, (M−K) multiplexed symbols may be mapped.

FIG. 2 shows an example of mapping two types of control information, that is, control information 1 and control information 2 to a set of resource elements. Referring to FIG. 2, a sequence of multiplexed symbols is mapped by a time-first mapping method. That is, the sequence of multiplexed symbols is sequentially mapped from the first symbol position of the first subcarrier to the right. If mapping ends within one subcarrier, mapping is sequentially performed from the first symbol position of the next subcarrier to the right. Hereinbelow, a symbol may refer to an SC-FDMA symbol. The control information 1 and data information are mapped by a time-first mapping method in order of control information 1→data information. The control information 2 is mapped only to symbols located at both sides of RS symbols in order of last subcarrier→first subcarrier. The last subcarrier refers to a subcarrier located at the bottom of a set of resource elements of FIG. 2 and the first subcarrier refers to a subcarrier located at the top of the set of resource elements. The control information 1 rate-matches with data information and is mapped. The control information 2 punctures the data information and/or the mapped control information 1 and is mapped. The data information may be formed by sequentially concatenating multiple code blocks segmented from one transport block.

When multiplexing data information and control information, the following should be considered.

First, a multiplexing rule should not be changed by the amount and type of control information or presence/absence of control information. Second, when control information is multiplexed with data by rate matching or control information punctures data and/or other types of control information, the control information should not affect transmission of other data of a cyclic buffer. Third, a starting point of a cyclic buffer for a next redundancy version should not be influenced by presence/absence of control information. Fourth, in a hybrid automatic repeat request (HARQ) transmission scheme, HARQ buffer corruption should be able to be avoided. In a method for mapping multiplexed information to a data channel, a specific type of control information should be mapped to resource elements adjacent to an RS which can show good capability.

In the method of FIG. 2, since two types of control information are mapped to a virtual physical channel together with data information, a new rule is demanded to map another type of control information. In the method of FIG. 2, when the control information 2 punctures the data information and/or the control information 1, puncturing is performed from the last code block. However, if probability of generating an error in the last code block by transmission environments and a code rate is high, an error may occur only in the last code block. In that case, the error is detected after all code blocks are decoded, determination of a transmission error is delayed and power consumed to decode the code blocks is increased.

SUMMARY OF THE INVENTION

An object of the present invention devised to solve the problem lies in providing a method for mapping control information by a prescribed rule considering presence/absence and type of the control information to improve the capability of a wireless radio communication system.

The object of the present invention can be achieved by providing a method for multiplexing data information and a plurality of control information in a wireless mobile communication system, including (a) mapping first control information in units of resource elements on a matrix for generating input information mapped to a set of physical resource elements so that the first control information is mapped to resource elements separated by one resource element in a time axis from resource elements to which a reference signal is mapped in the set of physical resource elements; (b) mapping a sequence on the matrix in units of resource elements so that the sequence does not overwrite the mapped first control information, wherein the sequence is formed by multiplexing second information and the data information; and (c) mapping third control information on the matrix in units of resource elements so that the third control information is mapped to resource elements adjacent in a time axis to the resource elements to which the reference signal is mapped in the set of physical resource elements.

In another aspect of the present invention, provided herein is a wideband wireless mobile communication system, including a data and control multiplexing unit for multiplexing second control information and data information, and a channel interleaver for multiplexing a sequence generated from the data and control multiplexing unit with a plurality of control information, wherein in the channel interleaver, (a) first control information is mapped in units of resource elements on a matrix for generating input information mapped to a set of physical resource elements so that the first control information is mapped to resource elements separated by one resource element in a time axis from resource elements to which a reference signal is mapped in the set of physical resource elements; (b) the sequence is mapped on the matrix in units of resource elements so that the sequence does not overwrite the mapped first control information; and (c) third control information is mapped on the matrix in units of resource elements so that the third control information is mapped to resource elements adjacent in a time axis to the resource elements to which the reference signal is mapped in the set of physical resource elements.

In step (a), the first control information may be mapped upwards starting from the last row of the matrix, or may be mapped downwards starting from a specific row of the matrix so as to include the last row of the matrix; in step (b), the sequence may be mapped downwards starting from the first row of the matrix; and in step (c), the third control information may be mapped upwards starting from the last row of the matrix, or may be mapped downwards from a specific row of the matrix so as to include the last row of the matrix.

In step (b), symbols of the sequence mapped within each row may be mapped leftwards, rightwards, or in a specific order in each row.

In step (a), symbols of the first control information mapped to each row may be mapped, within each row, rightwards starting from a leftmost element among elements of the matrix corresponding to resource elements separated by one resource element from the resource elements to which the reference signal is mapped, may be mapped leftwards from a rightmost element, or may be mapped in a specific order; and in step (c), symbols of the third control information mapped to each row may be mapped, within each row, rightwards starting from a leftmost element among elements of the matrix corresponding to the adjacent resource elements, may be mapped leftwards starting from a rightmost element, or may be mapped in a specific order.

In step (a), symbols of the first control information mapped to each row may be mapped, within each row, leftwards starting from a rightmost element among elements of the matrix corresponding to resource elements separated by one resource element from the resource elements to which the reference signal is mapped, may be mapped rightwards from a leftmost element, or may be mapped in a specific order; and in step (c), symbols of the third control information mapped to each row may be mapped, within each row, leftwards starting from a rightmost element among elements of the matrix corresponding to the adjacent resource elements, may be mapped rightwards starting from a leftmost element, or may be mapped in a specific order.

In step (a), the first symbol among symbols of the first control information mapped to each row may be mapped, within each row, to a leftmost element among elements of the matrix corresponding to resource elements separated by one resource element from resource elements to which the reference signal is mapped, and the other symbols except for the first symbol may be mapped, within each row, leftwards starting from a rightmost element among elements of the matrix corresponding to resource elements separated by one resource element from resource elements to which the reference signal is mapped; and, in step (c), the first symbol among symbols of the third control information mapped to each row may be mapped, within each row, to a leftmost element among elements of the matrix corresponding to the adjacent resource elements, and the other symbols except for the first symbol among symbols of the third control information may be mapped, within each row, leftwards starting from a rightmost element among elements of the matrix corresponding to the adjacent resource elements.

The first control information may be rank indication (RI), the second control information may be information including at least one of channel quality information (CQI) and a precoding matrix index (PMI), and the third control information may be information about acknowledgement/negative acknowledgement (ACK/NACK) which is a hybrid automatic repeat request (HARQ) response.

The set of physical resource elements may be comprised of C symbol periods and R subcarriers, the entire length of the C symbol periods may be the same as the length of one sub-frame comprised of two slots, the reference signal may be mapped two symbol periods which are not adjacent to each other among the C symbol periods, the two symbol periods may be respectively allocated to the two slots, the matrix may be comprised of (C−2) columns and R rows, each element of the matrix correspond one by one to each resource element of an area except for the two symbol periods among the set of physical resource elements, the method may further include, before the mapping step, forming the sequence by arranging the second control information and the data information such that the data information is arranged after the second control information, step (a) is performed only when the first control information exists, and step (c) is performed only when the third control information exists.

In a further aspect of the present invention, provided herein is a method for multiplexing data information and a plurality of control information in a wireless mobile communication system. The method includes mapping a sequence and third control information on a matrix in units of resource elements, wherein the sequence is formed by multiplexing first control information, second control information, and data information, the matrix is to generate input information mapped to a set of physical resource elements, the first control information and the third control information are mapped to resource elements adjacent in a time axis to resource elements to which a reference signal is mapped among the set of the physical resource elements, and the sequence is mapped so as not to overwrite the first control information and the third control information.

In another aspect of the present invention, provided herein is a wideband wireless mobile communication system including a channel interleaver for multiplexing data information and a plurality of control information, wherein, in the channel interleaver, a sequence and third control information are mapped on a matrix for generating input information mapped to a set of physical resource elements, the sequence being formed by multiplexing first control information, second control information and the data information; the first control information and the third control information are mapped to resource elements adjacent in a time axis to resource elements to which a reference signal is mapped among the set of the physical resource elements; and the sequence is mapped so as not to overwrite the first control information and the third control information.

The sequence may be mapped starting from the last row of the matrix upwards, the third control information may be mapped starting from the first row of the matrix downwards, and the first control information may be mapped downwards starting from the next row of the bottom row among rows to which the second control information is mapped.

The sequence may be mapped starting from the first row of the matrix downwards, the third control information may be mapped starting from the last row of the matrix upwards, and the first control information may be mapped upwards starting from the next row of the top row among rows to which the second control information is mapped.

The sequence may be mapped starting from the last row of the matrix upwards, the third control information may be mapped starting from the first row of the matrix downwards, and the first control information may be mapped upwards starting from the next row of the top row among rows to which the second control information is mapped.

The sequence may be mapped starting from the first row of the matrix downwards, the third control information may be mapped starting from the last row of the matrix upwards, and the first control information may be mapped downwards starting from the next row of the bottom row among rows to which the second control information is mapped.

The sequence may be mapped upwards starting from the last row of the matrix, the third control information may be mapped downwards starting from the first row of the matrix, alternating rows, and the first control information may be mapped downwards starting from the second row of the matrix, alternating rows.

The sequence may be mapped starting from the last row of the matrix upwards, the first control information may be mapped downwards starting from the first row of the matrix, alternating rows, and the third control information may be mapped downwards starting from the second row of the matrix, alternating rows.

At least one of the sequence, the first control information, and the third control information may be mapped leftwards starting from a right column within each row, may be mapped rightwards starting from a left column, or may be mapped in a specific order, and the other one except for the at least one of the sequence, the first control information, and the third control information may be mapped rightwards starting from a left column within each row, may be mapped leftwards starting from a right column, or may be mapped in a specific order.

The set of physical resource elements may be comprised of C symbol periods and R subcarriers, the entire length of the C symbol periods may be the same as the length of one subframe comprised of two slots, the reference signal may be mapped two symbol periods which are not adjacent to each other among the C symbol periods, the two symbol periods may be respectively allocated to the two slots, the matrix may be comprised of (C−2) columns and R rows, each element of the matrix correspond one by one to each resource element of an area except for the two symbol periods among the set of physical resource elements, and the method may further include, before the mapping step, forming the sequence by arranging the second control information and the data information such that the data information is arranged after the second control information.

The first control information may be RI, the second control information may be information including at least one of CQI and a PMI, and the third control information may be information about ACK/NACK which is a response of HARQ.

In mapping data and control information, uniform multiplexing and mapping rules considering presence/absence of control information and a type of control information are provided.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
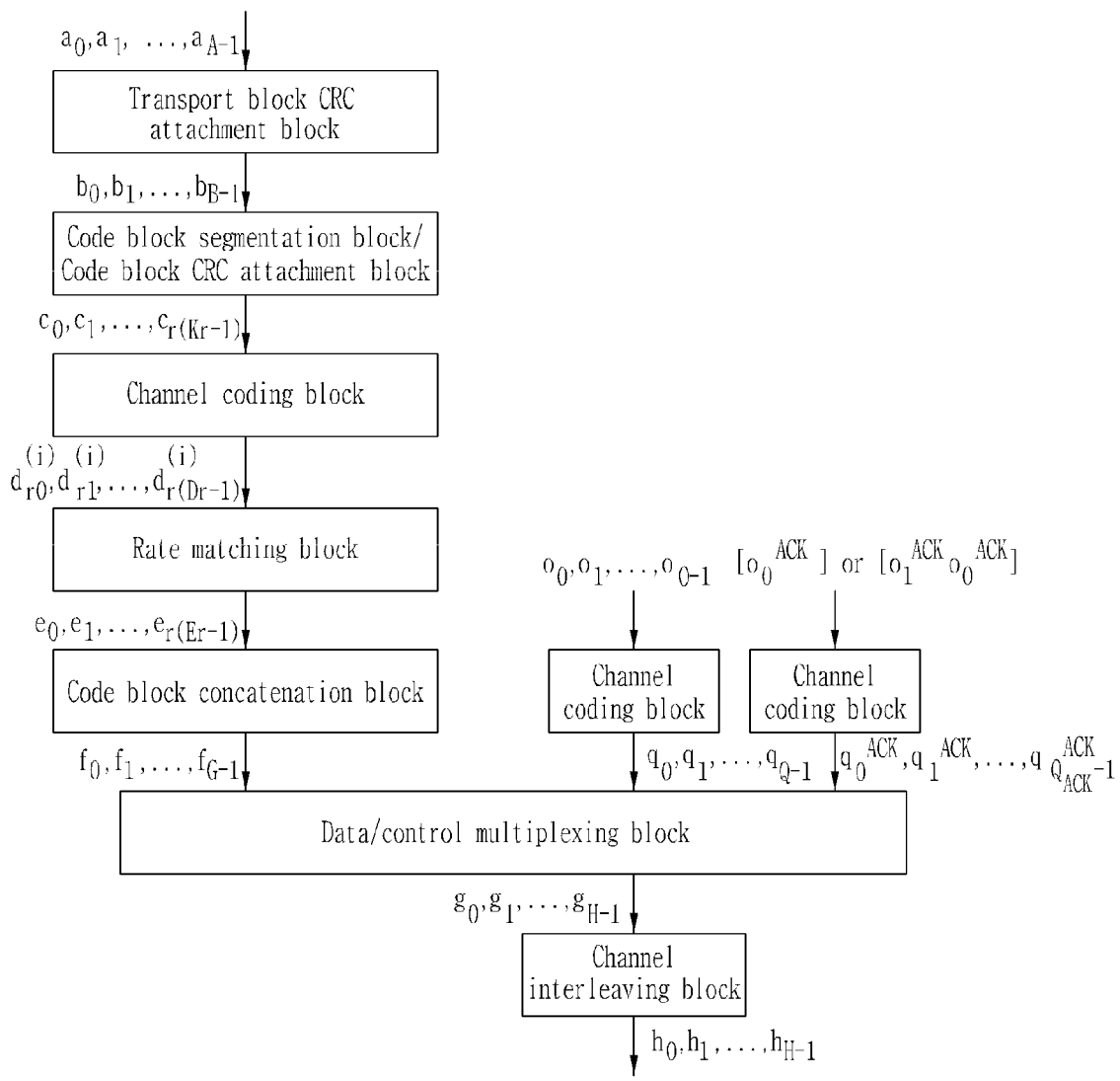
FIG. 1 illustrates processing for a transport channel and/or control information.
Figure 2:
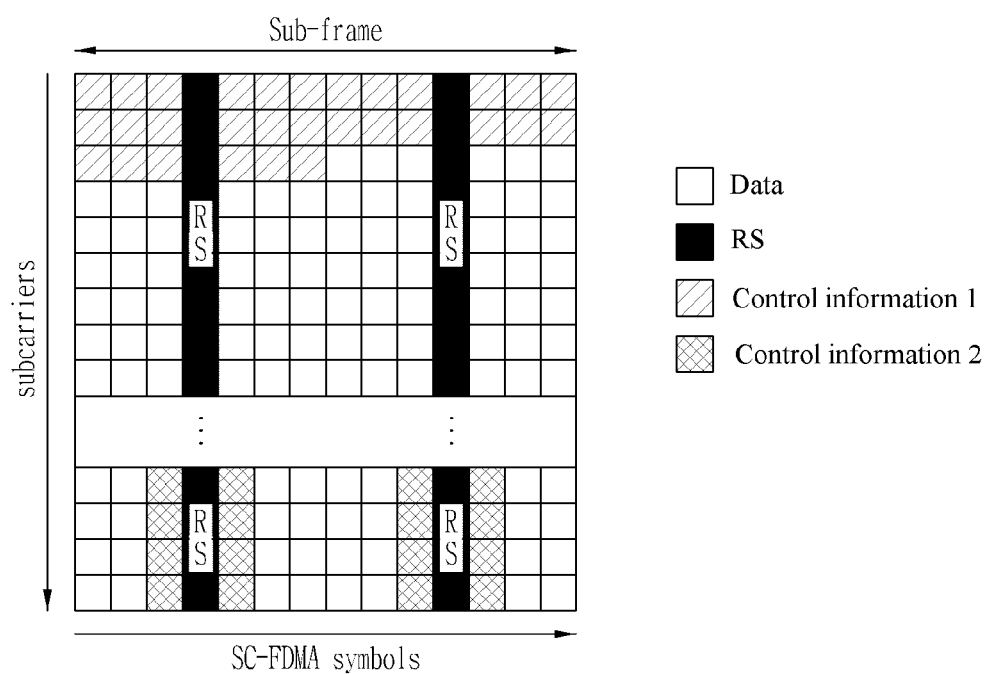
FIG. 2 illustrates an example of transport channel processing for a UL-SCH of 3GPP.
Figure 3A:
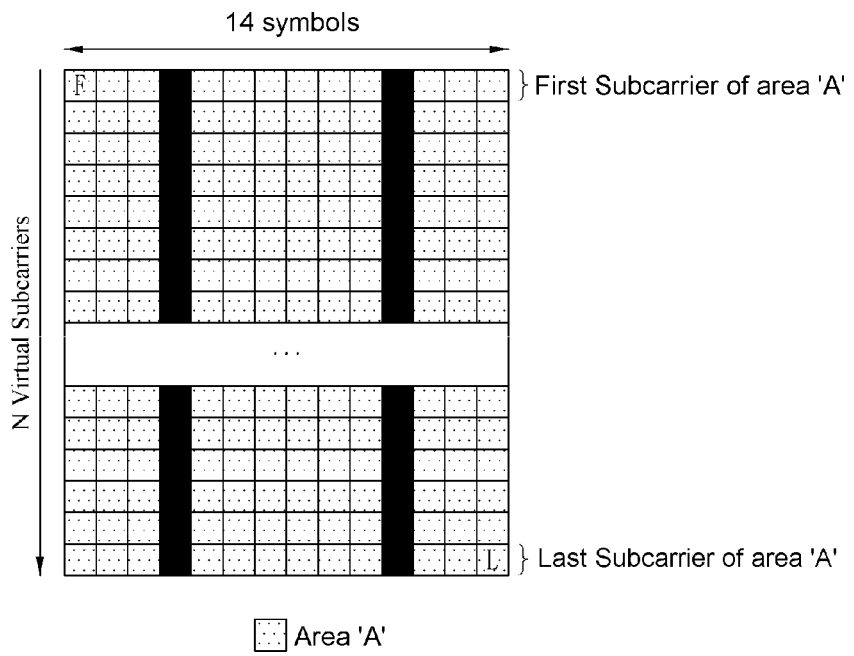
FIGS. 3a to 6b are views for defining terms which are commonly used to explain embodiments of FIG. 7 to FIG. 13.
Figure 3B:
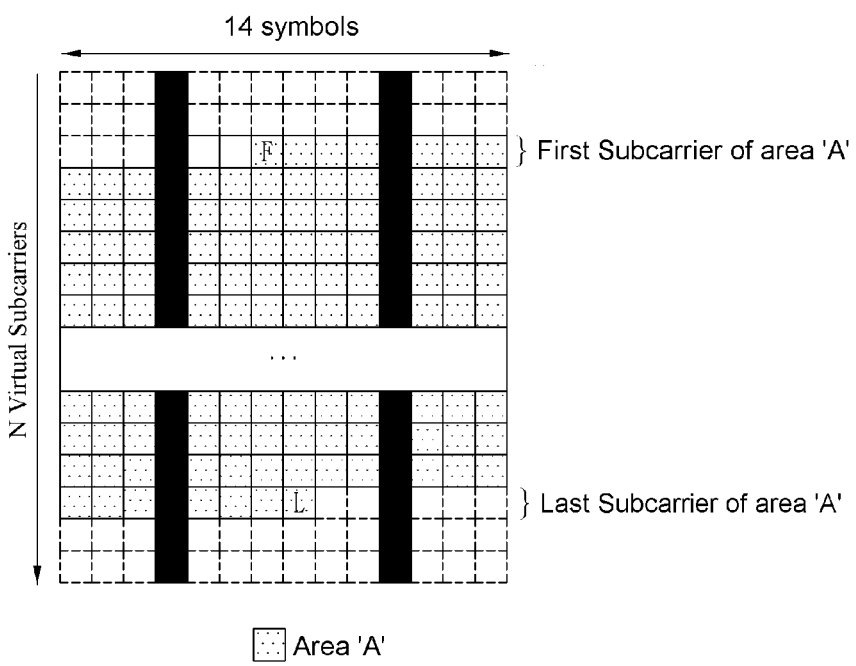

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. The same reference numbers will be used throughout this specification to refer to the same or like parts.

In actual implementation, each element in a block diagram may be divided into two hardware chips, or two or more elements may be integrated into one hardware chip.

Exemplary embodiments described hereinbelow may be used for processing of a transport channel, especially a UL-SCH, of the 3GPP.

Control information may be classified into various types according to an arbitrary method or 'importance' thereof. Here, 'importance' may be determined by evaluating a degree of influence on the capability of a wireless mobile communication system when any type of control information fails in transmission. When multiple types of control information are present, a new multiplexing scheme is required to improve the capability of a wireless mobile communication system. For example, control information of a more important type may be multiplexed s as not to be overwritten by control information of a less important type.

In the present invention, control information 1 may be channel quality information (CQI)/precoding matrix index (PMI) which is a combination of CQI indicating channel quality and of a PMI indicating index information of a codebook used for pre-coding. The control information 1 may rate-match with data information for multiplexing. Control information 2 may be acknowledgement/negative acknowledgement (ACK/NACK) which is a HARQ response. The control information 2 may puncture the data information or the control information 1 for multiplexing. Control information 3 may be a rank indication or rank information (RI) indicating the number of transport streams. The control information 3 may puncture the data information or the control information 1 or may rate-match with the data information and/or the control information 1, for multiplexing.

Structures of exemplary embodiments proposed by the present invention may be modified and applied to a structure of up-down or right-left symmetry with respect to a frequency axis and a time axis in a set of resource elements comprised of resource elements. In the exemplary embodiments of the present invention, a symbol may be an SC-FDMA symbol.

The term 'puncturing' refers to eliminating a specific bit (or symbol) from a sequence comprised of multiple bits (or symbols) and inserting a new bit (or symbol) into the sequence. That is, puncturing serves to replace a part of information with other information, and when data information or control information is multiplexed, a bit (or symbol) of punctured information is replaced with puncturing information. When a puncturing scheme is used, the length of whole bits (or symbols) is maintained even after new information is inserted. A code rate of punctured information is influenced by puncturing.

The term 'rate matching' refers to adjusting a code rate of data information. When data information or control information is multiplexed, the location of each information may be changed but contents of information are not influenced. 'Rate matching' of control information 1 and data information represents that the amount of adding rate-matched control information and rate-matched data information has a prescribed size. Therefore, if the amount of control information 1 to be transmitted is increased, the amount of data information rate-matching with the control information 1 is decreased by that much.

If a transport block is segmented into multiple code blocks for transmission, a receiving side can sequentially decode the code blocks from a code block No. 0. At this time, if the code blocks are punctured using control information from the last code block of data information, an error may occur only in the last code block due to transmission environments and a code rate. Then error detection is delayed and considerable power is consumed in decoding the code blocks. If control information which punctures data is present, since puncturing is performed beginning from the front code block, an early stop is possible in a decoding process.

Multiple code blocks generated from the code block segmentation block of FIG. 1 may have different sizes. In this case, the front code block may have a smaller size than a rear code block. In this case, the respective code blocks may rate-match in the rate matching block of FIG. 1 so that the code blocks of different sizes have the same size. Then the front code block having a relatively short length has a lower code rate than the rear code block having a long length. Therefore, when code blocks are punctured by control information, the front code block is less influenced by the rear code block.

In the exemplary embodiments of FIG. 7 to FIG. 12, when data information is punctured by control information, for example, control information 2, the data information is punctured beginning from the first code block. Then a probability of generating an error at the first code block is relatively increased. If an error is generated at the first code block, since it is possible to early determine whether a transmission error occurs, power consumed for decoding of code blocks can be decreased. Compared with a conventional method, the influence of puncturing on data information is relatively reduced.

FIG. 3a to FIG. 6b are views for defining terms commonly used in this application to describe the exemplary embodiments of FIG. 7 to FIG. 13.

A set of resource elements shown in FIG. 3a to FIG. 13 is based on a configuration of a normal CP and it is assumed that M (=R×C) resource elements are constructed. Here, 'C' denotes the number of 'symbol periods' arranged in a time direction, and 'R' denotes the number of subcarriers arranged in a virtual frequency direction. The symbol period refers to a time period at which one symbol exits. Accordingly, the length of one symbol period is identical to the length of one symbol.

For the following description, a subcarrier located in the first row from the top in the whole area of a set of resource elements is defined as 'subcarrier 0' and a subcarrier located in the last row is defined as 'subcarrier R−1'. That is, the first subcarrier in a transmission band is defined as 'subcarrier 0', and the next subcarriers are sequentially defined as 'subcarrier 1', 'subcarrier 2', and the like. The last subcarrier is defined as 'subcarrier R−1'.

Figure 4A:
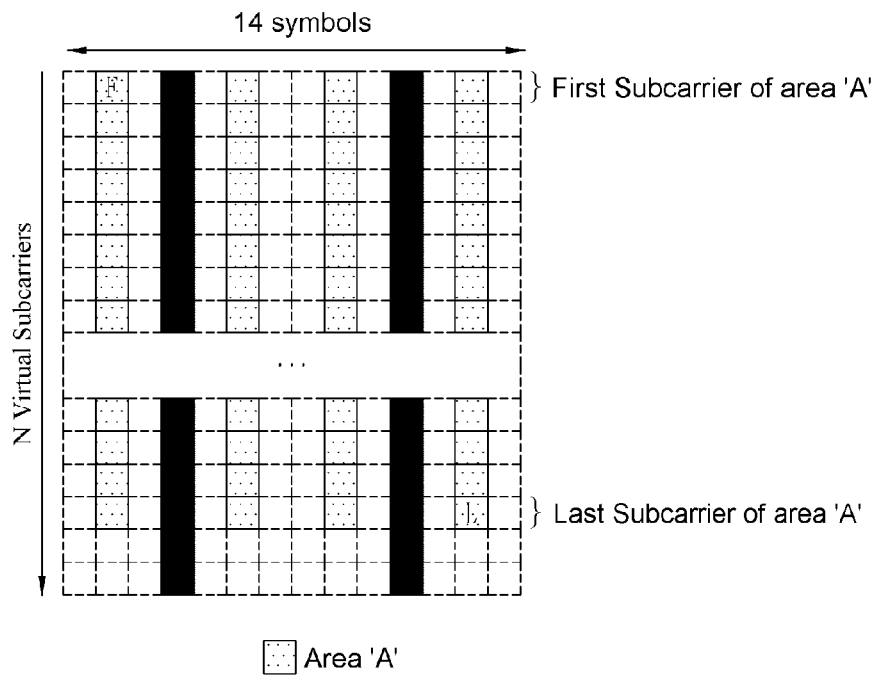
Figure 4B:
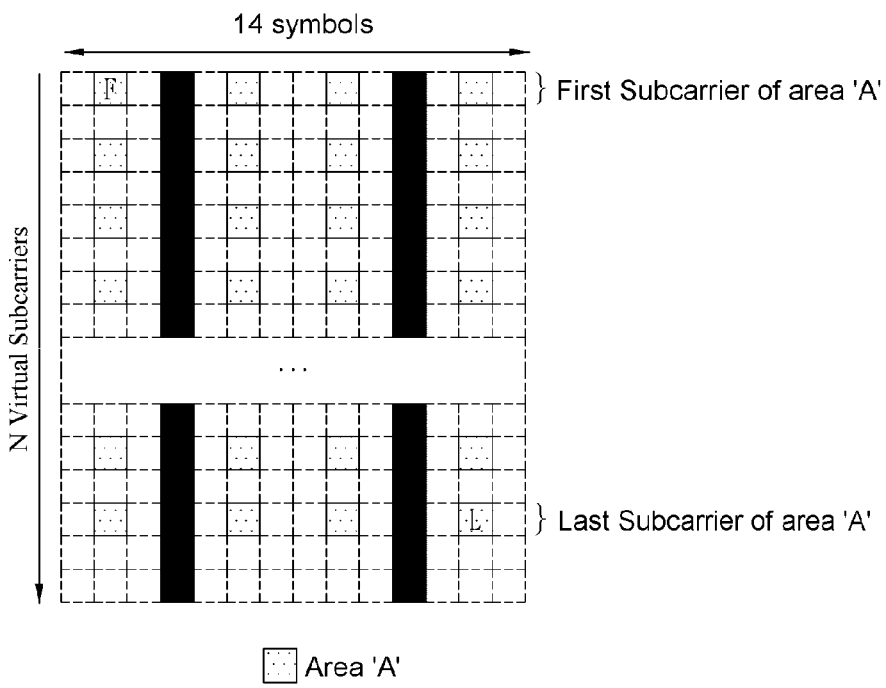

FIGS. 3a, 3b, 4a, and 4b illustrate the concept for describing the exemplary embodiments of the present invention. In the following description, the terms 'first subcarrier' and 'last subcarrier' may be used in relation to a specific time-frequency area ('area A'). The area A may be a part of a set of resource elements or the entire set of resource elements. The area A indicates any area in a set of resource elements and respective resource elements in the area A may be separated from each other in time or frequency as illustrated in FIG. 4b. The 'first subcarrier' of the area A denotes a subcarrier of a row at the top of the area A and the last subcarrier of the area A denotes a subcarrier of a row at the bottom of the area A. A 'first resource element' ('F') and a 'last resource element' ('L') are used in conjunction with the area A. Namely, the 'first resource element' of the area A denotes a resource element located most ahead in time in the first subcarrier of the area A, that is, a resource element in the leftmost column. The 'last resource element' denotes a resource element located latest in time in the last subcarrier of the area A, that is, a resource element in the rightmost column. The first resource element within one subcarrier refers to a resource element which is most ahead in time within the subcarrier. The last resource element refers to a resource element which is the latest in time within that subcarrier.

Figure 5A:
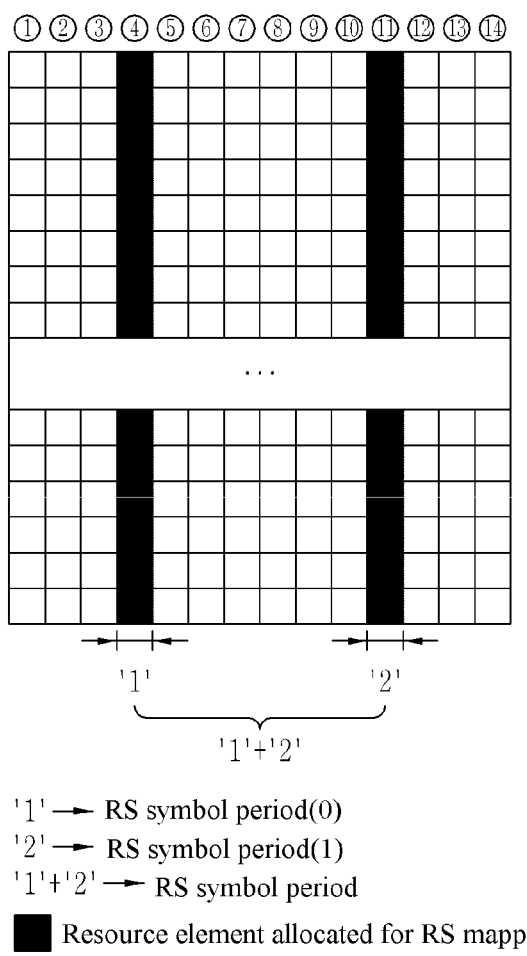

Referring to FIG. 5a, an RS is mapped to an 'RS symbol period' comprised of 'RS symbol period(0)' and 'RS symbol period(1)'. The RS symbol period(0) and the RS symbol period(1) may not be adjacent to each other.

An 'RS symbol period area' defined in the 'RS symbol period' will now be described. The RS symbol period area includes (2×R) resource elements located in the RS symbol period. The 'RS symbol period area' is divided into 'RS symbol period area(0)' and 'RS symbol period area(1)'. Each of the RS symbol period area(0) and the RS symbol period area(1) has R resource elements in a frequency direction.

Figure 5B:
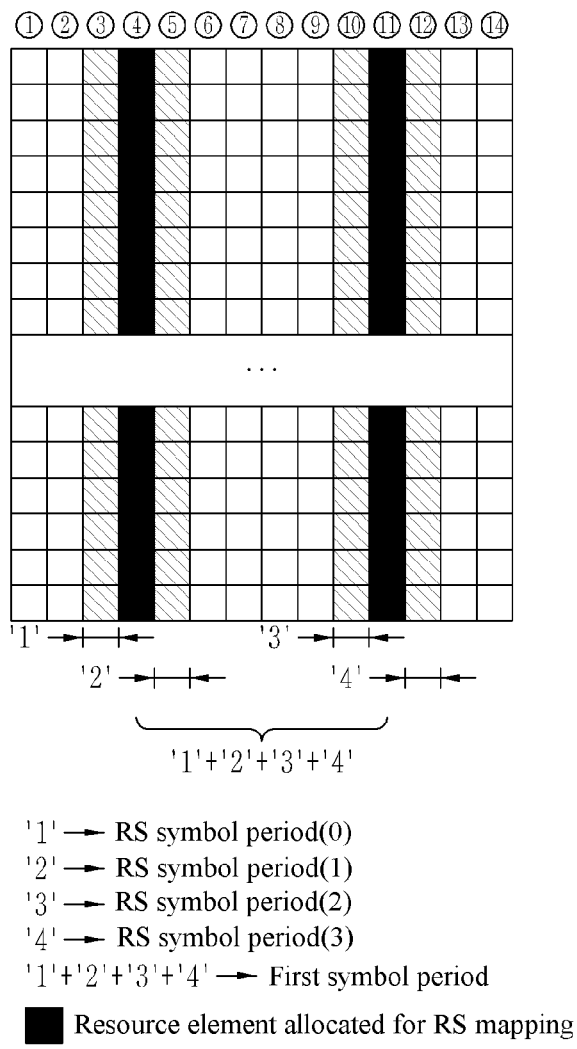
Figure 6A:
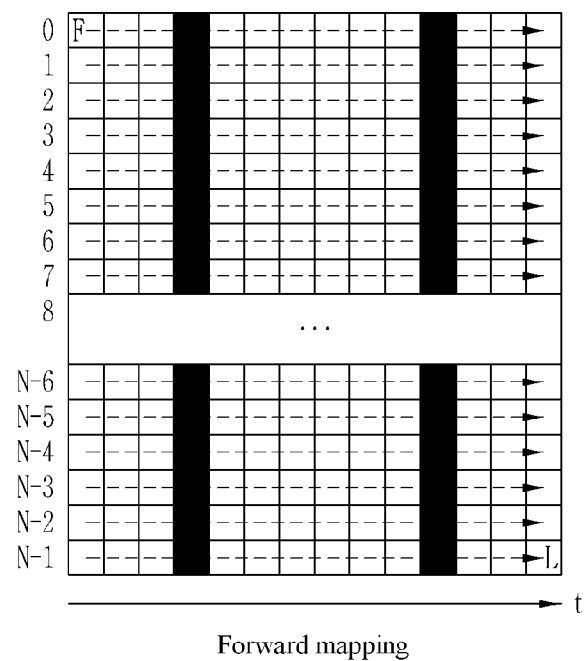
Figure 6B:
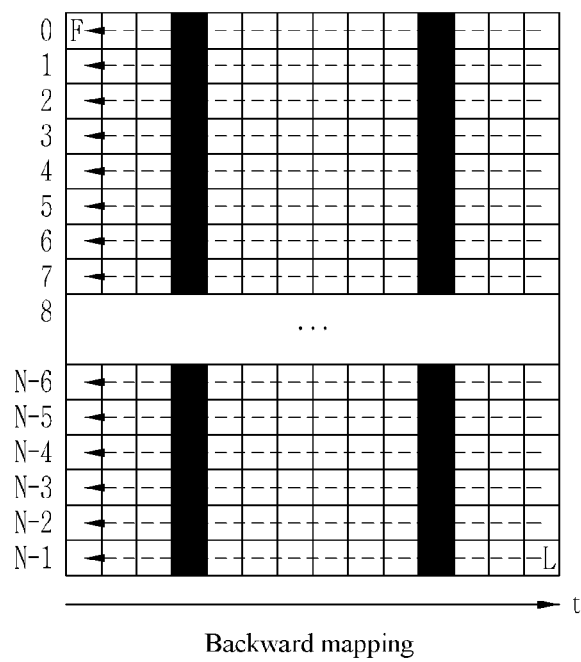

Referring to FIG. 5b, a 'first symbol period' is defined as 4 symbol periods separated from the RS symbol period by a zero symbol period. A 'first symbol period area' includes (4×R) resource elements located in the first symbol period. Therefore, in FIGS. 3a to 6b, the 'first symbol period' is further divided into 'first symbol period area(0)', 'first symbol period area(1)', 'first symbol period area(2)', and 'first symbol period area(3)'.

Referring to FIG. 5c, a 'second symbol period' is defined as 4 symbol periods separated from the RS symbol period by one symbol period. A 'second symbol period area' includes (4×R) resource elements located in the second symbol period. Therefore, in FIGS. 3a to 6b, the 'second symbol period area' is further divided into 'second symbol period area(0)', 'second symbol period area(1)', 'second symbol period area(2)', and 'second symbol period area(3)'.

RS symbol periods shown in FIGS. 3a to 13 are not always located in the fourth and eleventh symbol periods.

The RS symbol period area, the first symbol period area, and the second symbol period area may be regarded as the area A.

The term 'forward mapping order' is used in relation to the area A. Being mapped in the forward mapping order from a specific resource element in the area A refers to a 2-dimensional mapping method in which, within the area A, mapping is performed from a subcarrier to which a specific resource element belongs in a downward direction, and, within each subcarrier, mapping is performed according to time flow, that is, from a left column to a right column. For example, mapping in the forward mapping order from the first resource element of the whole area depicted in FIG. 3a means that mapping is performed in order of from subcarrier 0 to subcarrier N−1 along arrows (dotted lines) (refer to FIG. 6a). A backward mapping order indicates a method of the reverse order to the forward mapping order. Being mapped in the backward mapping order from a specific resource element in the area A refers to a 2-dimensional mapping method in which, within the area A, mapping is performed from a subcarrier to which a specific resource element belongs in an upward direction, and, within each subcarrier, mapping is performed in reverse order of time flow, that is, from a right column to a left column. For example, if mapping is performed in the backward mapping order from the last resource element of the whole area depicted in FIG. 3a, mapping is performed in order of from subcarrier N−1 to subcarrier 0 along arrows (dotted lines) (refer to FIG. 6b).

Although a set of resource elements shown in FIGS. 3a to 13 is based on the configuration of a normal CP, the same principle may be applied to the configuration of an extended CP comprised of 12 symbols.

Embodiment 1

Figure 7:
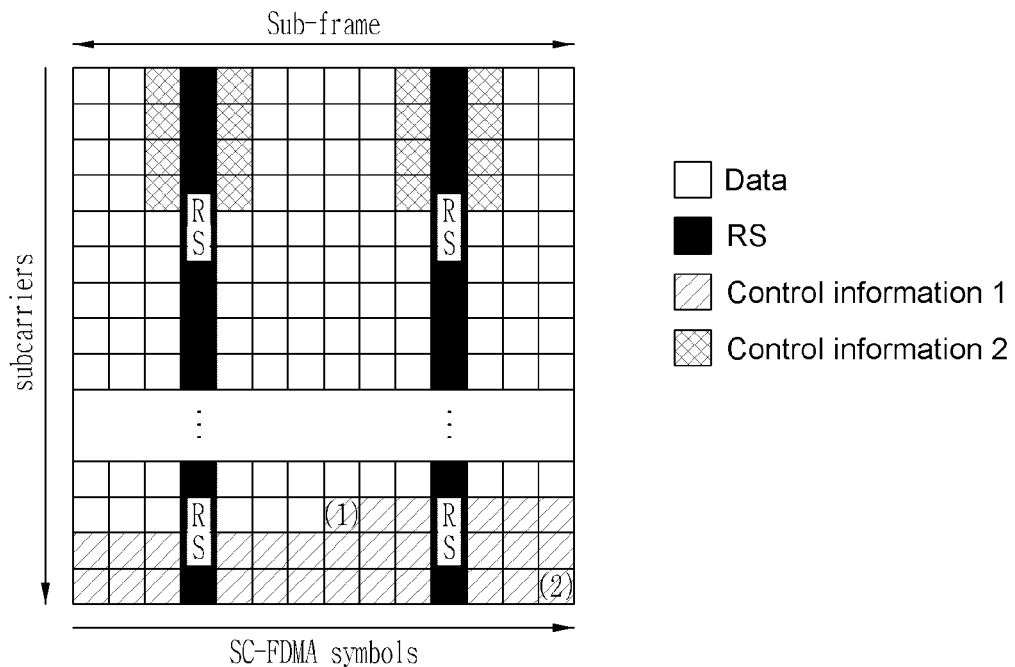
FIG. 7 illustrates a method for multiplexing and mapping data information and control information to a set of resource elements according to an exemplary embodiment of the present invention.

FIG. 7 illustrates a method for multiplexing and mapping data information and control information to a set of resource elements according to an exemplary embodiment of the present invention.

Referring to FIG. 7, control information 1 is mapped in a time axis (symbol axis) direction and control information 2 is mapped to resource elements corresponding to symbols next to symbols to which an RS is mapped. That is, the control information 2 is mapped to the above-described first symbol period area.

The control information 1 is mapped to one or more successive resource elements including the last resource element except for resource elements allocated for RS mapping within the whole area shown in FIG. 7. The control information 1 may be mapped in order of (1)→(2). Namely, the control information 1 may be mapped in a forward mapping order from the first resource element of an area to which the control information 1 is mapped. Alternatively, the control information 1 may be mapped in order of (2)→(1). That is, the control information 1 may be mapped in a backward mapping order from the last resource element of the area to which the control information 1 is mapped.

The control information 2 is mapped to resource elements located just before or just after resource elements to which the RS is mapped. For example, if the RS is mapped to a j-th resource element, the control information 2 may be mapped to a (j−1)-th resource element and a (j+1)-th resource element. The control information 2 is mapped in a forward, backward, or specific mapping order in the first symbol period area.

The above method may be modified to up-down or right-left symmetry in a set of resource elements of FIG. 7. Namely, the control information 1 may be mapped to one or more successive resource elements including the first resource element, except for the resource elements allocated for RS mapping in the whole area shown in FIG. 7. In this case, the control information 1 may be mapped in a forward or backward mapping order. The control information 2 is mapped to the first symbol period area and may be mapped in a forward, backward, or specific mapping order in the first symbol period area.

In FIG. 7, the control information 1 does not puncture data information. In other words, the control information 1 rate-matches with the data information. The control information 1 may be constructed in such a form that control information having different properties is concatenated. The control information 2 may puncture the data information and/or the control information 1 in the first symbol period area. If the number of symbols of the control information 2 is greater than the number of resource elements of the first symbol period area, the control information 2 may puncture the control information 1 mapped outside the first symbol period area.

Embodiment 2

Figure 8:
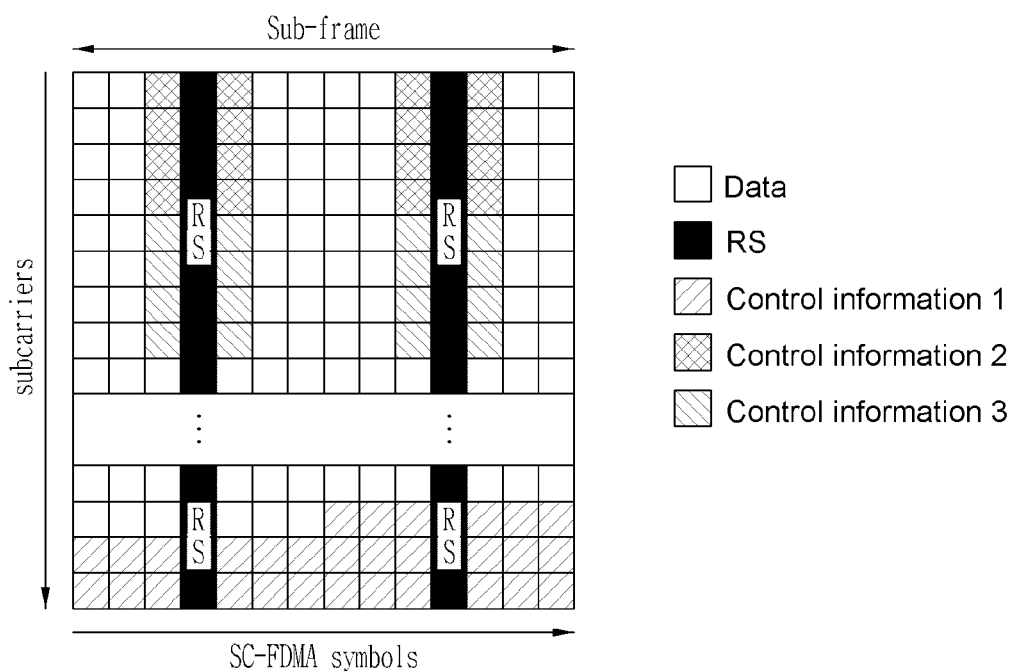
FIG. 8 illustrates a method for multiplexing and mapping data information and control information to a set of resource elements according to another exemplary embodiment of the present invention.

FIG. 8 illustrates a method for multiplexing and mapping data information and control information to a set of resource elements according to another exemplary embodiment of the present invention.

In FIG. 8, control information 1 is mapped by the same method as the method used in FIG. 7. Control information 2 and control information 3 are mapped to a first symbol period area. The control information 2 is mapped in a forward, backward, or specific mapping order in the first symbol period area. The control information 3 is mapped in a forward, backward, or specific mapping order in an area except for an area to which the control information 2 is mapped in the first symbol period area. If the control information 3 does not exist, the method of FIG. 8 is the same as the method of FIG. 7.

In FIG. 8, the control information 1 does not puncture data information. Namely, the control information 1 rate-matches with the data information. The control information 1 may be constructed in such a form that control information having different properties is concatenated. The control information 2 and/or the control information 3 may puncture the data information and/or the control information 1 in the first symbol period area. If the sum of the number of symbols of the control information 2 and the number of symbols of the control information 3 is greater than the number of resource elements of the first symbol period area, the control information 2 and/or the control information 3 may puncture the control information 1 outside the first symbol period area. Alternatively, the control information 2 and/or the control information 3 may be transmitted through resource elements ensured by rate matching for the data information.

If the sum of the number of symbols of the control information 2 and the number of symbols of the control information 3 is greater than the number of resource elements of the first symbol period area, control information having a higher priority of the control information 2 and control information 3 may replace control information having a lower priority for mapping. In other words, all the control information of a high priority is first mapped to the first symbol period area and N information out of the control information of a low priority is mapped to the first symbol period area. Here, N is a value obtained by subtracting the number of resource elements to which the control information of a higher priority is mapped from the number of resource elements of the first symbol period area. For example, if a priority of the control information 2 is higher than a priority of the control information 3, all the control information 2 is first mapped to the first symbol period area and the control information 3 is mapped to the remaining resource elements in the first symbol period area. Therefore, a part of the control information 3 may not be mapped to the first symbol period area.

The method of FIG. 8 may be modified to up-down or right-left symmetry in the set of resource elements of FIG. 8 as illustrated in FIG. 7. Namely, the control information 1 may be mapped to one or more successive resource elements including the first resource element, except for resource elements to which an RS is mapped in a set of resource elements. In this case, the control information 1 may be mapped in a forward or backward mapping order. The control information 2 may be mapped in a forward, backward, or specific mapping order in the first symbol period area. The control information 3 may be mapped in a forward, backward, or specific mapping order from a next resource element of the last resource element to which the control information 2 is mapped.

Embodiment 3

Figure 9:
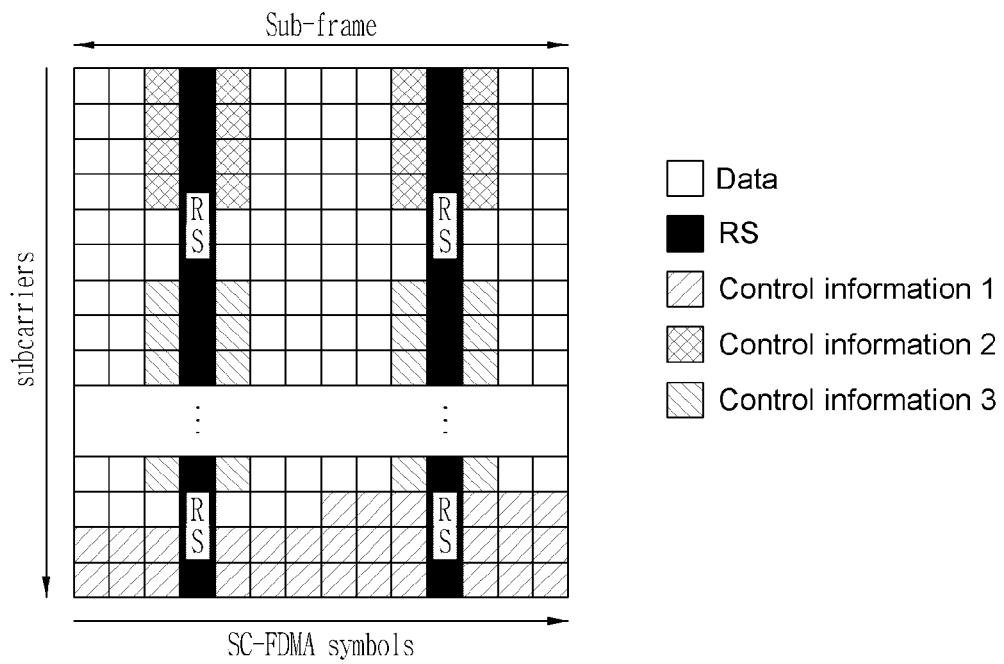
FIG. 9 illustrates a method for multiplexing and mapping data information and control information to a set of resource elements according to a further exemplary embodiment of the present invention.

FIG. 9 illustrates a method for multiplexing and mapping data information and control information to a set of resource elements according to a further exemplary embodiment of the present invention.

In FIG. 9, control information 1 is mapped by the same method as the method used in FIG. 7. Control information 2 and control information 3 are mapped to resource elements of the first symbol period area. The control information 2 is mapped in a forward, backward, or specific mapping order in the first symbol period area. The control information 3 may be mapped in a forward, backward, or specific mapping order to the first symbol period area, except for an area to which the control information 1 is mapped within the first symbol period area. If the control information 2 does not exist, the control information 1 and the control information 3 are mapped with dropping the control information 2 in FIG. 9, and if the control information 3 does not exist, the control information 1 and the control information 2 may be mapped with dropping the control information 3 in FIG. 9.

In FIG. 9, the control information 1 does not puncture data information. That is, the control information 1 rate-matches with the data information. The control information 1 may be constructed in such a form that control information having different properties is concatenated. The control information 2 and/or the control information 3 may puncture the data information and/or the control information 1 in the first symbol period area. If the sum of the number of symbols of the control information 2 and the number of symbols of the control information 3 is greater than the number of resource elements of the first symbol period area, the control information 2 and/or the control information 3 may puncture the control information 1 outside the first symbol period area. Alternatively, the control information 2 and/or the control information 3 may be transmitted through resource elements ensured by rate matching for the data information.

If the sum of the number of symbols of the control information 2 and the number of symbols of the control information 3 is greater than the number of resource elements of the first symbol period area, control information of a higher priority of the control information 2 and the control information 3 may replace control information of a lower priority for mapping. This is the same as described in FIG. 8.

The method of FIG. 9 may be modified to up-down or right-left symmetry in the set of resource elements of FIG. 9 as described in FIG. 7. Namely, the control information 1 may be mapped to one or more successive resource elements including the first resource element, except for resource elements allocated for RS mapping in a set of resource elements. In this case, the control information 1 may be mapped in a forward or backward mapping order. The control information 2 is mapped in a forward, backward, or specific mapping order in the first symbol period area. The control information 3 may be mapped in a forward, backward, or specific mapping order to the first symbol period area, except for an area to which the control information 1 is mapped within the first symbol period area.

Embodiment 4

Figure 10:
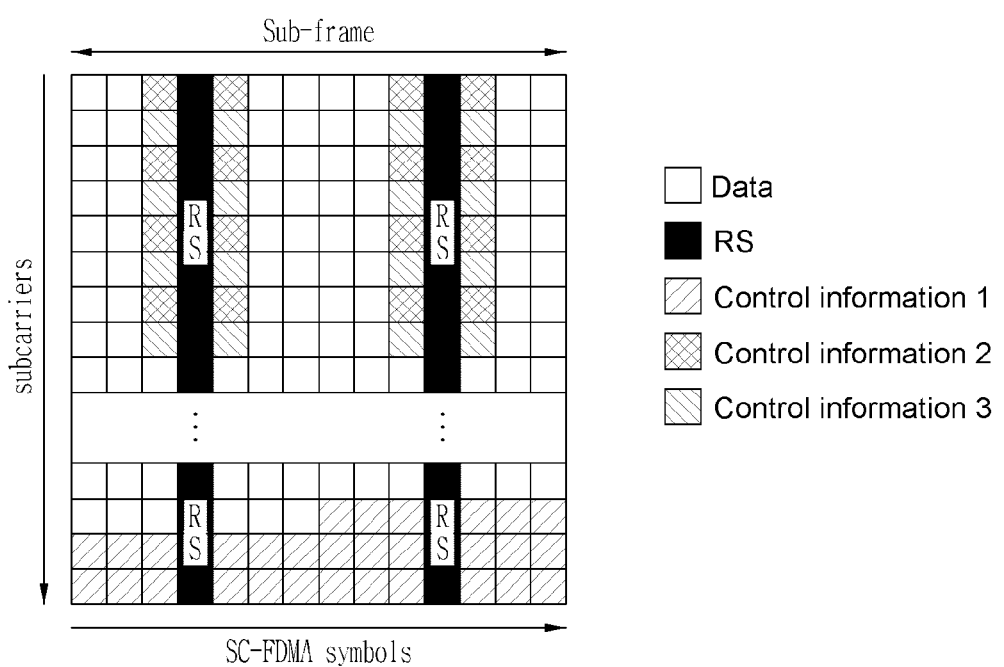
FIGS. 10 and 11 illustrate a method for multiplexing and mapping data information and control information to a set of resource elements according to another exemplary embodiment of the present invention.
Figure 11:
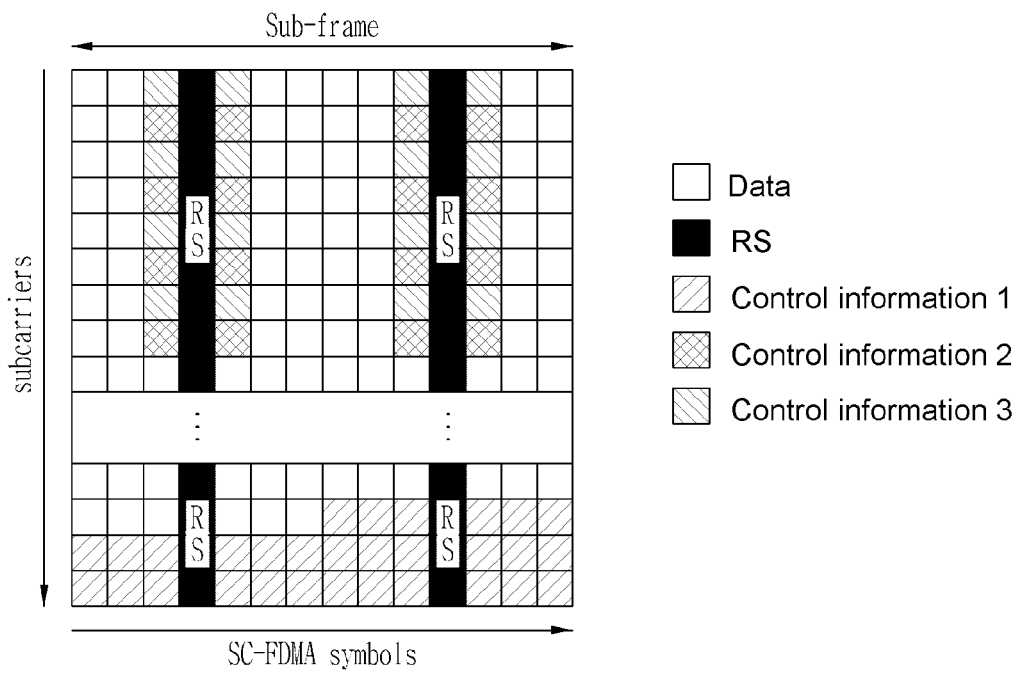

FIGS. 10 and 11 illustrate a method for multiplexing and mapping data information and control information to a set of resource elements according to another exemplary embodiment of the present invention.

In FIG. 10, control information 1 is mapped by the same method as the method used in FIG. 7. Control information 2 and control information 3 are mapped to a first symbol period area. The control information 2 and control information 3 may alternate with each other for mapping in the first symbol period area in units of subcarriers. Namely, 4 symbols of the control information 2 are mapped to resource elements of the first subcarrier of a whole area shown in FIG. 10, and 4 symbols of the control information 3 are mapped to resource elements of the second subcarrier. This process is repeated in units of subcarriers. Assuming that the number of symbols of the control information 2 is less than the number of symbols of the control information 3, all the symbols of the control information 2 are mapped and thereafter the symbols of the control information 3 may be mapped to the remaining subcarriers in the first symbol period area. If the number of the symbols of the control information 3 is less than the number of the symbols of the control information 2, the same mapping principle may be applied.

Alternatively, the control information 2 may first be mapped to the first, third, and fifth subcarriers of the whole area shown in FIG. 10, and next the control information 3 may be mapped to resource elements to which the control information 2 is not mapped in the first symbol period area.

In FIG. 10, the control information 1 does not puncture data information. Namely, the control information 1 rate-matches with the data information. The control information 1 may be constructed in such a form that control information having different properties is concatenated. The control information 2 and/or the control information 3 may puncture the data information and/or the control information 1 in the first symbol period area. If the sum of the number of symbols of the control information 2 and the number of symbols of the control information 3 is greater than the number of resource elements of the first symbol period area, the control information 2 and/or the control information 3 may puncture the control information 1 outside the first symbol period area. Alternatively, the control information 2 and/or the control information 3 may be transmitted through resource elements ensured by rate matching for the data information.

If the sum of the number of the symbols of the control information 2 and the number of the symbols of the control information 3 is greater than the number of resource elements belonging to the first symbol period area, control information having a higher priority of the control information 2 and the control information 3 may replace control information having a lower priority. This is the same as described in FIG. 8.

The method of FIG. 10 may be modified to up-down or right-left symmetry in a set of resource elements, as described in FIG. 7. That is, the control information 1 may be mapped to one or more successive resource elements including the first resource element, except for resource elements allocated for RS mapping in a set of resource elements. The control information 2 may be mapped in a backward mapping order from the last resource element of the last subcarrier in the first symbol period area. The control information 2 and the control information 3 may alternate with each other in the first symbol period area in units of subcarriers. Namely, 4 symbols of the control information 2 are mapped to the last subcarrier of the whole area shown in FIG. 10, and 4 symbols of the control information 3 are mapped to the second to the last subcarrier. This process may be repeated in units of subcarriers.

FIG. 11 is the same as FIG. 10 except that the locations of the control information 2 and the control information 3 are interchanged.

Embodiment 5

Figure 12:
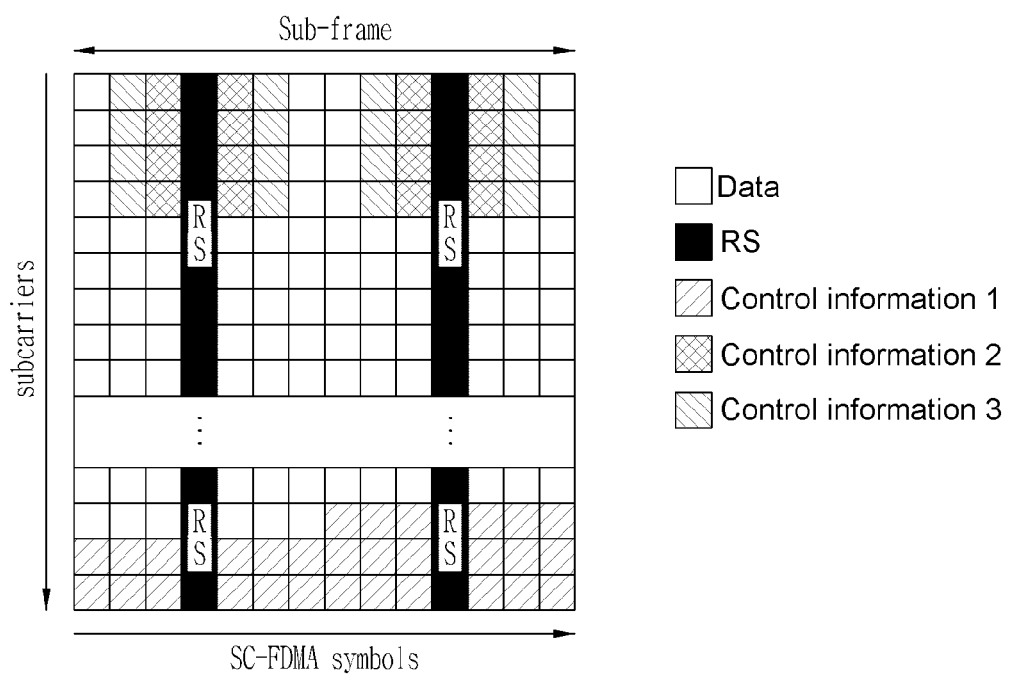
FIGS. 12 and 13 illustrate a method for multiplexing and mapping data information and control information to a set of resource elements according to another exemplary embodiment of the present invention.

FIG. 12 illustrates a method for multiplexing and mapping data information and control information to a set of resource elements according to another exemplary embodiment of the present invention.

In FIG. 12, control information 1 is mapped by the same method as the method used in FIG. 7. Control information 2 is mapped to the first symbol period area, and control information 3 is mapped to resource elements of a symbol period separated from the RS symbol period by one symbol period. Namely, the control information 3 is mapped to the above-described second symbol period area. The control information 2 is mapped in a forward, backward, or specific mapping order in the first symbol period area. The control information 3 is mapped in a forward, backward, or specific mapping order in the second symbol period area. If the control information 3 does not exist, the method of FIG. 12 is the same as the method of FIG. 7. If the control information 2 does not exist, the control information 1 and the control information 3 are mapped with dropping the control information 2 in FIG. 12, and if the control information 3 does not exist, the control information 1 and the control information 2 may be mapped with dropping the control information 3 in FIG. 12.

If the control information 3 is multiplexed by a puncturing scheme, puncturing of the control information 1 can be reduced by mapping the control information 3 to the second symbol period area, that is, to resource elements next to resource elements to which the control information 2 is mapped.

In FIG. 12, the control information 1 does not puncture data information. Namely, the control information 1 rate-matches with the data information. The control information 1 may be constructed in such a form that control information having different properties is concatenated. The control information 2 may puncture the data information and/or the control information 1 in the first symbol period area. The control information 3 may puncture the data information and/or the control information 1 in the second symbol period area. Alternatively, the control information 2 and/or the control information 3 may be transmitted through resource elements ensured by rate matching for the data information. For example, the control information 2 may puncture the data information and the control information 1, and control information 3 may rate-match with the data information and/or the control information 1 so that the control information 3 are inserted between the data information and/or control information 1.

If the number of symbols of the control information 2 is greater than the number of resource elements of the first symbol period area, the control information 2 may puncture the control information 1 outside the first symbol period area.

If the number of symbols of the control information 3 is greater than the number of resource elements of the second symbol period area, the control information 3 may puncture the control information 1 outside the second symbol period area.

The method of FIG. 12 may be modified to up-down or right-left symmetry in a set of resource elements. Such a configuration will now be described in conjunction with FIG. 13.

Embodiment 6

Figure 13:
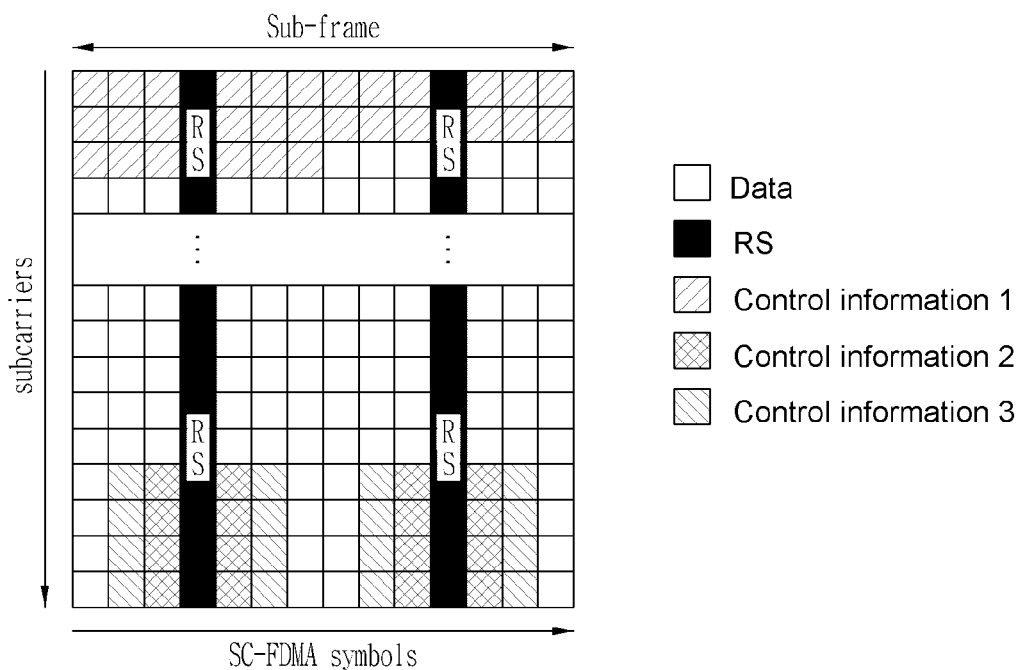

FIG. 13 illustrates a method for multiplexing and mapping data information and control information to a set of resource elements according to another exemplary embodiment of the present invention.

In FIG. 13, control information 1 may be mapped to one or more successive resource elements including the first resource element, except for resource elements allocated for RS mapping in a whole area shown in FIG. 13. Control information 2 is mapped to the above-described first symbol period area and control information 3 is mapped to the above-described second symbol period area. Namely, the control information 2 is mapped to a symbol period before and after a symbol period to which the RS is mapped, and the control information 3 is mapped to a symbol period separated by one symbol period from the symbol period to which the RS is mapped. The control information 2 may be mapped in a forward, backward, or specific mapping order in the first symbol period area. The control information 3 may be mapped in a forward, backward, or specific mapping order in the second symbol period area. If the control information 2 does not exist, the control information 1 and the control information 3 may be mapped with dropping the control information 2 in FIG. 13, and if the control information 3 does not exist, the control information 1 and the control information 2 may be mapped with dropping the control information 3 in FIG. 13.

If the control information 3 is multiplexed in a manner of puncturing other information, puncturing of the control information 1 can be reduced by mapping the control information 3 to the second symbol period area, that is, to resource elements next to resource elements to which the control information 2 is mapped.

In FIG. 13, the control information 1 does not puncture data information. Namely, the control information 1 rate-matches with the data information. The control information 1 may be constructed in such a form that control information having different properties is concatenated. The control information 2 may puncture the data information and/or the control information 1 mapped to the first symbol period area. The control information 3 may puncture the data information and/or the control information 1 mapped to the second symbol period area.

Alternatively, the control information 2 and/or the control information 3 may be transmitted through resource elements ensured through rate matching for the data information. For example, the control information 2 may puncture the data information and the control information 1, and the control information 3 may rate-match with the data information and/or the control information 1 so that the control information 3 are inserted between the data information and/or the control information 1.

If the number of symbols of the control information 2 is greater than the number of resource elements of the first symbol period area, the control information 2 may puncture the control information 1 outside the first symbol period area.

If the number of symbols of the control information 3 is greater than the number of resource elements of the second symbol period area, the control information 3 may puncture the control information 1 outside the second symbol period area.

In the embodiment of FIG. 13, the control information 1 may be multiplexed with the data information before being mapped to a set of resource elements. That is, the control information 1 and the data information are multiplexed to generate a multiplexed stream so that the data information is arranged after the control information 1. Next, the multiplexed stream is mapped in a forward mapping order from the first resource element of a whole area shown in FIG. 13, or in a backward mapping order from the last resource element of the whole area shown in FIG. 10. By such a method, the control information 1 can be mapped to one or more successive resource elements including the first or last resource element, except for resource element allocated for RS mapping in the whole area shown in FIG. 10. It will be appreciated that even if the control information 1 does not exist, the above-described embodiments may be used. If the control information 2 does not exist, the control information 1 and the control information 3 are mapped with dropping the control information 2 in FIG. 13, and if the control information 3 does not exist, the control information 1 and the control information 2 may be mapped with dropping the control information 3 in FIG. 13.

Since the structure of FIG. 13 is symmetrical to the structure of FIG. 12, the method in FIG. 13 shares characteristics described in FIG. 12. Hereinafter, in the method of FIG. 12 or FIG. 13, the location of the control information 3 will be described in detail with reference to Table 1 to Table 9.

Before a description of Table 1 to Table 9 is given, the above-described embodiments of FIGS. 7 to 13 will be described in more detail. The control information 1 may be multiplexed with the data information before being mapped to a set of resource elements. Namely, the control information 1 and the data information are multiplexed to generate a multiplexed stream so that the data information is arranged after the control information 1. Next, the multiplexed stream is mapped in a forward mapping order from the first resource element of the whole area shown in each drawing, or in a backward mapping order from the last resource element of the whole area shown in each drawing. By such a method, the control information 1 can be mapped to one or more successive resource elements including the first or last resource element, except for resource elements allocated for RS mapping within the whole area of a set of resource elements. Even though the control information 1 does not exist, it will be appreciated that the above-described embodiments may be used.

In the embodiments of FIGS. 8 to 13, if the control information 2 does not exist, the control information 1 and the control information 3 are mapped without the control information 2 in each drawing, and if the control information 3 does not exist, the control information 1 and the control information 2 may be mapped without the control information 3 in each drawing.

In the method of FIG. 12 or FIG. 13, the location of the control information 3, that is, the second symbol period may be defined as in any one of the following Table 1 to Table 9. Table 1 to Table 9 indicate a symbol period to which the control information 3 can be mapped according to a configuration of a cyclic prefix (CP) and a configuration of a sounding reference signal (SRS). Although in FIG. 12 or FIG. 13 a normal CP is used as a CP, an extended CP may be applied by the same method.

Figure 14A:
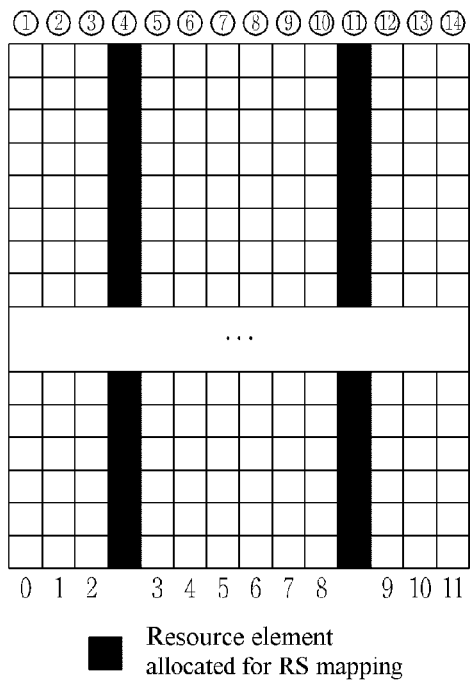
FIGS. 14a and 14b illustrate configurations of an exemplary embodiment in which a normal CP and an extended CP are respectively used.
Figure 14B:
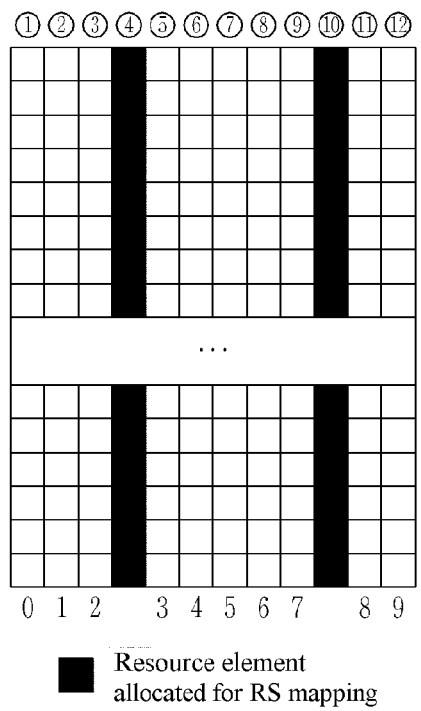

FIG. 14a illustrates a configuration of an exemplary embodiment in which a normal CP is used, and FIG. 14b illustrates a configuration in which an extended CP is used.

A symbol period to which data information and control information are mapped may be changed by the configuration of a CP or the configuration of an SRS. When a normal CP is used, one subframe is comprised of 14 symbol periods as shown in FIG. 14a. It is assumed in Table 1 to Table 9 that an RS is located in the fourth ('④') and eleventh ('⑪') symbol periods among the 14 symbol periods. When an extended CP is used, one subframe is comprised of 12 symbol periods as shown in FIG. 14b. It is assumed in Table 1 to Table 7 that the RS is located in the fourth ('④') and tenth ('⑩') symbol periods. Meanwhile, symbol periods in which the RS is located may be changed unlike Table 1 to Table 9, and in this case symbol periods to which the data information and the control information are mapped may be changed unlike Table 1 to Table 9.

In Table 1 to Table 9, numbers within '{ }' of 'Column Set' indicate symbol periods to which the control information 3 can be mapped. These numbers are allocated except for symbol periods allocated for RS mapping in FIGS. 14a and 14b. In more detail, numbers in '{ }' denote symbol periods corresponding to numbers arranged in the bottom of FIG. 14a and/or FIG. 14 b. Numbers in '{ }' may be 0 to 11 in the normal CP and may be 0 to 9 in the extended CP.

Table 1 to Table 9 include configurations in which an SRS is mapped to the first symbol period and to the last symbol period. In Table 1 to Table 9, 'First SC-FDMA symbol' means that the SRS is mapped to the first symbol period, 'Last SC-FDMA symbol' means that the SRS is mapped to the last symbol period, and 'No SRS' means that no SRS is mapped.

TABLE 1

| CP Configuration | SRS Configuration | Column Set |
| --- | --- | --- |
| Normal | No SRS | {1, 4, 7, 10} |
|  | First SC-FDMA symbol | {0, 3, 6, 9} |
|  | Last SC-FDMA symbol | {1, 4, 7, 10} |
| Extended | No SRS | {1, 4, 6, 9} |
|  | First SC-FDMA symbol | {0, 3, 5, 8} |
|  | Last SC-FDMA symbol | {1, 4, 6} or {1, 4, 5, 6} or {0, 1, 4, 6} or {0, 1, 4, 5} |

In Table 1, in the last SC-FDMA symbol of the extended CP, one of multiple column sets may be used.

TABLE 2

| CP Configuration | SRS Configuration | Column Set |
| --- | --- | --- |
| Normal | No SRS | {1, 4, 7, 10} |
|  | First SC-FDMA symbol | {0, 3, 6, 9} |
|  | Last SC-FDMA symbol | {1, 4, 7, 10} |
| Extended | No SRS | {1, 4, 6, 9} |
|  | First SC-FDMA symbol | {0, 3, 5, 8} |
|  | Last SC-FDMA symbol | {1, 4, 6, 9} |

In the extended CP, an SRS may not be permitted to be mapped to the last symbol period, or even if the SRS is permitted, the SRS may be dropped. Then as illustrated in Table 2, the 'Last SC-FDMA symbol' may have the same column set as the 'No SRS'.

TABLE 3

| CP Configuration | SRS Configuration | Column Set |
|---|---|---|
| Normal | No SRS | {1, 4, 7, 10} |
|  | First SC-FDMA symbol | {0, 3, 6, 9} |
|  | Last SC-FDMA symbol | {1, 4, 7, 10} |
| Extended | No SRS | {1, 4, 6, 9} |
|  | First SC-FDMA symbol | {0, 3, 5, 8} |
|  | Last SC-FDMA symbol | {1, 4, 5, 6} |

The 'Last SC-FDMA symbol' of the extended CP of Table 3 represents that the location of symbol periods to which the control information 3 is mapped may be modified due to the SRS.

TABLE 4

| CP Configuration | SRS Configuration | Column Set |
|---|---|---|
| Normal | No SRS | {1, 4, 7, 10} |
|  | First SC-FDMA symbol | {0, 3, 6, 9} |
|  | Last SC-FDMA symbol | {1, 4, 7, 10} |
| Extended | No SRS | {1, 4, 6, 9} |
|  | First SC-FDMA symbol | {0, 3, 5, 8} |
|  | Last SC-FDMA symbol | {1, 4, 6, 9} |

In the extended CP, the SRS may not be permitted to be mapped to the last symbol period, or even if the SRS is permitted, the SRS may be dropped. The extended CP of Table 4 can be used when the 'Last SC-FDMA symbol' SRS is not permitted, or the 'Last SC-FDMA symbol' SRS can be dropped even though the 'Last SC-FDMA symbol' SRS is permitted. If the first SC-FDMA symbol SRS is not used, the extended CP of Table 4 may be constructed without the first SC-FDMA symbol part (including 'Column set' thereof).

TABLE 5

| CP Configuration | SRS Configuration | Column Set |
|---|---|---|
| Normal | No SRS | {1, 4, 7, 10} |
|  | Last SC-FDMA symbol | {1, 4, 7, 10} |
| Extended | No SRS | {1, 4, 6, 9} |
|  | Last SC-FDMA symbol | {1, 4, 6, 9} |

Referring to FIGS. 14a and 14b, it can be understood that the configuration of 'Column Set' of Table 5 corresponds to the second symbol period area. That is, the control information 3 is mapped to a symbol period separated from a symbol period allocated for RS mapping by one symbol period. Although number '9' in 'Last SC-FDMA symbol' of the extended CP indicates the location of the SRS, such a configuration may be used when the SRS is not permitted to be mapped to the last symbol period, or when the SRS is dropped even though the SRS is permitted. Further, since the location of the 'Column Set' in each CP configuration is the same, Table 5 may be indicated by a configuration without the SRS.

TABLE 6

| CP Configuration | SRS Configuration | Column Set |
|---|---|---|
| Normal | No SRS | {1, 4, 7, 10} |
|  | Last SC-FDMA symbol | {1, 4, 7, 10} |
| Extended | No SRS | {1, 4, 6, 9} |
|  | Last SC-FDMA symbol | {1, 4, 6, 5} |

Referring to FIGS. 14a and 14b, it can be understood that each configuration of Table 6 except for 'Last SC-FDMA symbol' in the extended CP corresponds to the second symbol period area. Moreover, it can be understood that the control information 3 is not mapped to resource elements of the first symbol period. 'Last SC-FDMA symbol' of the extended CP of Table 6 is not mapped to a symbol period '9' because an SRS is mapped to the location of the symbol period '9'. Comparing Table 6 with Table 5, the configurations of 'Last SC-FDMA symbol' in the extended CP are different. Namely, the control symbol 3 located in the symbol period '9' in Table 5 is mapped to a symbol period '5' which is not adjacent to a symbol period allocated for RS mapping in Table 6. In the extended CP of Table 6, 'Column set' {1, 4, 6, 5} of 'Last SC-FDMA symbol' means that a symbol period '6' may have a higher priority for mapping than a symbol period '5' because the symbol period '6' is nearer to the symbol period allocated for RS mapping are mapped than the symbol period '5'. In more detail, in a process of uniformly filling the control information to each symbol period symbol, the symbol period '6' has priority over the symbol period '5' if the control information should be filled in only one of the symbols periods '5' and '6'. However, even though the column set is indicated by {1, 4, 6, 5}, priority may be allocated in order of {1, 4, 5, 6}. The location of the symbol period to which the control information 3 is mapped is important.

TABLE 7

| CP Configuration | SRS Configuration | Column Set |
|---|---|---|
| Normal | No SRS | {1, 4, 7, 10} |
|  | Last SC-FDMA symbol | {1, 4, 7, 10} |
| Extended | No SRS | {1, 4, 6, 5} |
|  | Last SC-FDMA symbol | {1, 4, 6, 5} |

Referring to FIGS. 14a and 14b, it can be appreciated that the configuration of the extended CP of Table 7 corresponds to the second symbol period area. It can also be appreciated in Table 7 that the control information 3 is not mapped to resource elements of the first symbol period. Unlike Table 5 and Table 6, Table 7 has the same 'Column Set' in the extended CP irrespective of an SRS configuration. In the extended CP of Table 7, 'Column set' {1, 4, 6, 5} of 'Last SC-FDMA symbol' means that a symbol period '6' may have a higher priority for mapping than a symbol period '5' because the symbol period '6' is nearer to the symbol period allocated for RS mapping than the symbol period '5'. In more detail, in a process of uniformly filling the control information to each symbol period symbol, the symbol period '6' has priority over the symbol period '5' if the control information should be filled in only one of the symbol periods '5' and '6'. However, even though the column set is indicated by {1, 4, 6, 5}, priority may be allocated in order of {1, 4, 5, 6}. The location of the symbol period to which the control information 3 is mapped is important. Since Table 7 has the same 'Column Set' in each CP irrespective of the SRS configuration, Table 7 may be indicated without the SRS configuration.

Figure 15A:
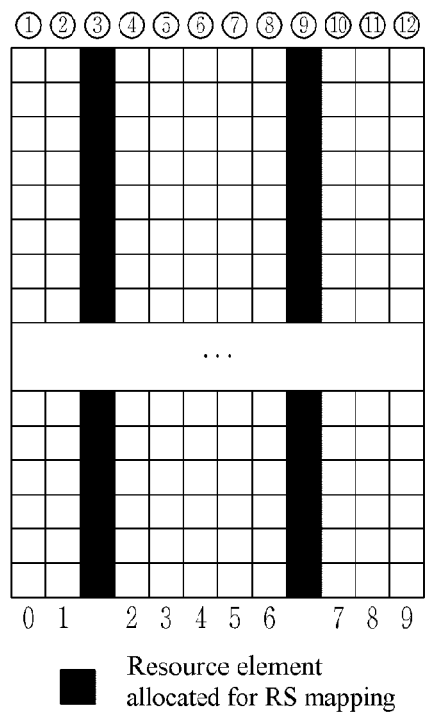
FIGS. 15a and 15b illustrate exemplary structures of an extended.
Figure 15B:
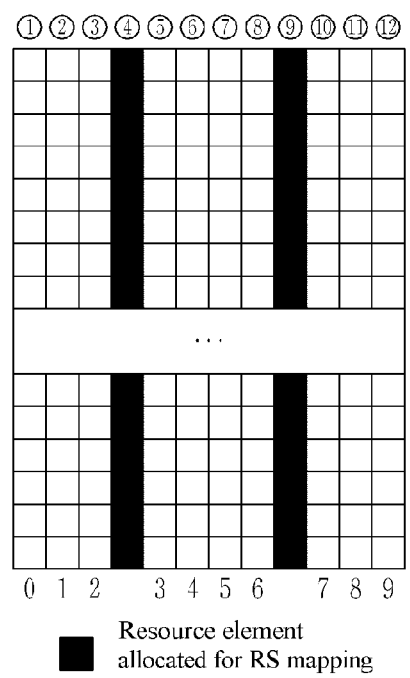

FIGS. 15a and 15b illustrate exemplary structures of an extended CP to explain configurations of the following Table 8 and Table 9.

TABLE 8

| CP Configuration | SRS Configuration | Column Set |
| --- | --- | --- |
| Normal | No SRS | {1, 4, 7, 10} |
|  | Last SC-FDMA symbol | {1, 4, 7, 10} |
| Extended | No SRS | {0, 3, 5, 8} |
|  | Last SC-FDMA symbol | {0, 3, 5, 8} |

Table 8 illustrates a configuration when a symbol period allocated for RS mapping in an extended CP is changed. Especially, it is assumed in Table 8 that the RS is located in the third ('③') and the ninth ('⑨') symbol periods (refer to FIG. 15a). In the extended CP of Table 8, the control information 3 is mapped to a symbol period separated from the symbol period allocated for RS mapping by one symbol period. That is, the control information 3 is mapped to the second symbol period. Referring to Table 8, it can be appreciated that the location of the symbol period to which the control information 3 is mapped may be changed according to locations of an RS and an SRS.

TABLE 9

| CP Configuration | SRS Configuration | Column Set |
| --- | --- | --- |
| Normal | No SRS | {1, 4, 7, 10} |
|  | Last SC-FDMA symbol | {1, 4, 7, 10} |
| Extended | No SRS | {1, 4, 5, 8} |
|  | Last SC-FDMA symbol | {1, 4, 5, 8} |

Table 9 illustrates a configuration when a symbol period allocated for RS mapping in the extended CP is changed. Especially, it is assumed in Table 9 that the RS is located in the fourth ('④') and the ninth ('⑨') symbol periods (refer to FIG. 15b).

Figure 16:
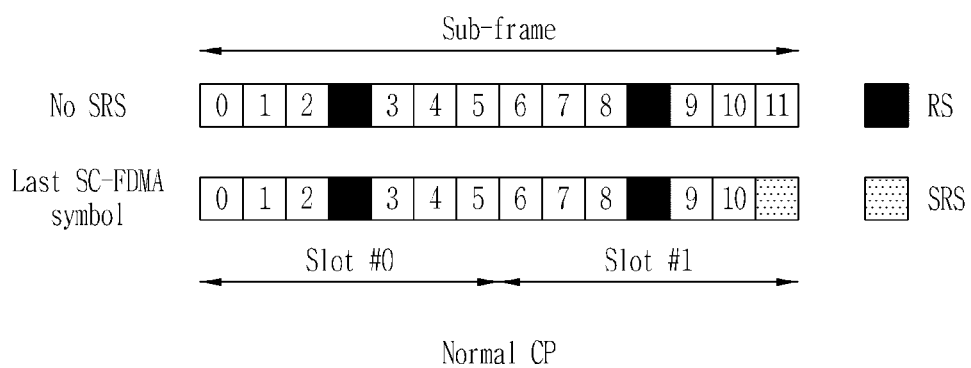
FIGS. 16 and 17 illustrate an example of locations to which an SRS and an RS are allocated within one subframe in case of a normal CP and an extended CP, respectively.
Figure 17:
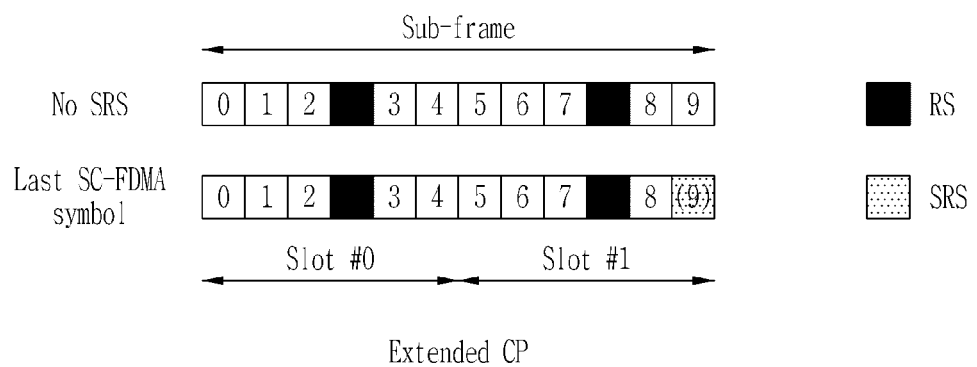

FIGS. 16 and 17 illustrate an example of locations to which an SRS and an RS are allocated within one subframe in case of a normal CP and an extended CP, respectively.

FIG. 16 and FIG. 17 correspond to FIG. 14a and FIG. 14b, respectively, and illustrate cases where an SRS is not mapped and an SRS is mapped to the last symbol. The control information 3 is mapped to a symbol period separated by one symbol length from a symbol period allocated for RS mapping in consideration of a modulation order. Therefore, in FIG. 16, the control information 3 is mapped to symbol periods having indexes of 1, 4, 7, and 10. In FIG. 17, the control information 3 is mapped to symbol periods having indexes of 1, 4, 6, and 9.

Embodiment 7

FIGS. 18a to 18f illustrate a mapping order of control information 2 and/or control information 3 in a time direction within one subcarrier according to the present invention.

Each of the control information 2 and the control information 3 can be mapped to a maximum of 4 resource elements per subcarrier. FIGS. 18a to 18f illustrate a mapping order of symbols for 4 resource elements within one subcarrier. Although a symbol number to which each control information is mapped may be changed according to a CP configuration, an relative indexing order may be determined as illustrated in FIGS. 18a to 18f. FIGS. 18a to 18f show examples of mapping 10 symbols generated after encoding in a normal CP configuration without an SRS.

Hereinafter, FIGS. 18a to 18f will be described based on the control information 2.

Figure 18A:
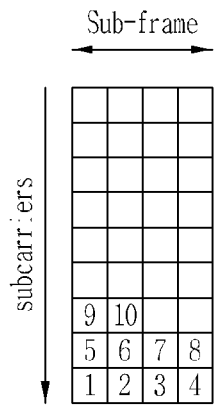
FIGS. 18a to 18f illustrate a mapping order of control information 2 and/or control information 3 in a time direction within one.

In FIGS. 18a to 18f, only the first symbol period area is shown. In FIG. 18a, the control information 2 is mapped in an upward direction from the last subcarrier of the first symbol period area and is mapped according to time flow within each subcarrier. In this case, control information 2 is mapped to all 4 available resource elements within the last subcarrier of the first symbol period area.

Figure 18B:
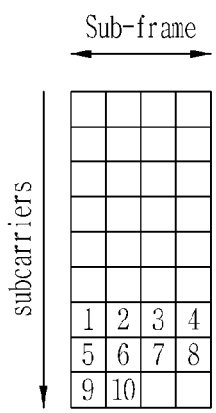

In FIG. 18b, the control information 2 is mapped in a downward direction from a specific subcarrier of the first symbol period area in consideration of the number of symbols of the control information 2 and is mapped according to time flow within each subcarrier. In this case, control information 2 is mapped to all 4 available resource elements within the specific subcarrier and is mapped also to resource elements within the last subcarrier of the first symbol period area.

Figure 18C:
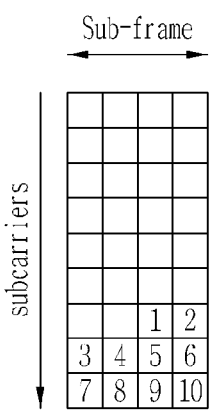

In FIG. 18c, the control information 2 is mapped in a downward direction from a specific subcarrier of the first symbol period area in consideration of the number of symbols of the control information 2 and is mapped according to time flow within each subcarrier. In this case, the control information 2 is mapped to all 4 available resource elements within the last subcarrier of the first symbol period area.

Figure 18D:
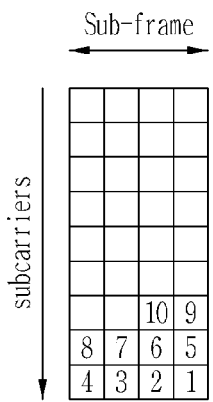

In FIG. 18d, the control information 2 is mapped in an upward direction from the last subcarrier of the first symbol period area and is mapped in reverse order of time flow within each subcarrier. In this case, the control information 2 is mapped to all 4 available resource elements within the last subcarrier of the first symbol period area. In this manner, when four or more of the control information 2 are mapped, it is guaranteed that all of the four available resource elements within the last subcarrier of the first symbol period area are used for mapping.

Figure 18E:
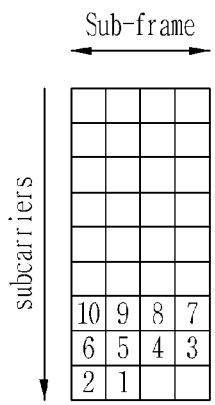

In FIG. 18e, the control information 2 is mapped in an upward direction from the last subcarrier of the first symbol period area in consideration of the number of symbols of the control information 2 and is mapped in reverse order of time flow within each subcarrier. In this case, the control information 2 is mapped to all 4 available resource elements within the top subcarrier.

Figure 18F:
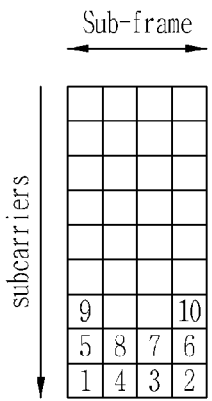

FIG. 18f, which is a modification of the method of FIG. 18d, modifies a mapping order of 4 resource elements within each subcarrier. In more detail, the control information 2 is cyclically shifted by one to the right in the method in which mapping is performed in a reverse order of time flow within each subcarrier. The control information 2 may be cyclically shifted by two or three.

While FIGS. 18a to 18f illustrate a mapping order of the control information 2, the same method may be applied to the control information 3.

Figure 19A:
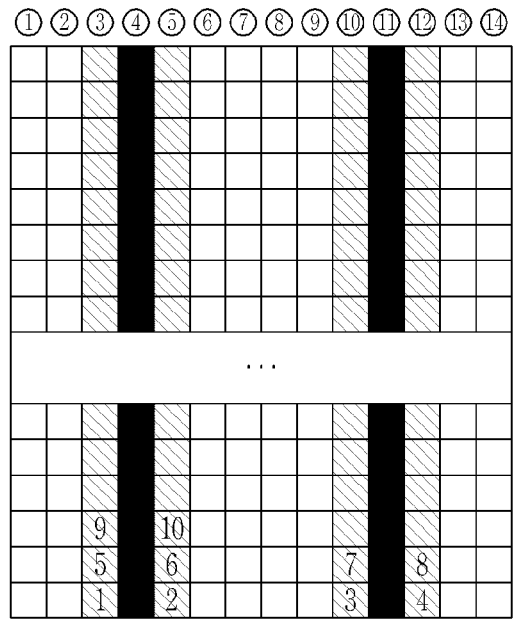
FIGS. 19a to 21b are views explaining in detail the methods of FIGS. 18a to 18f and illustrate examples of applying the methods of FIGS. 18a to 18f to a set of resource elements having a matrix structure of R×C.
Figure 19B:
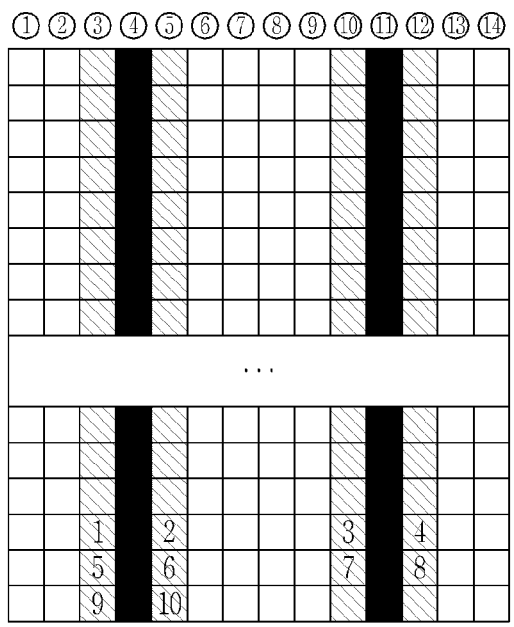
Figure 20A:
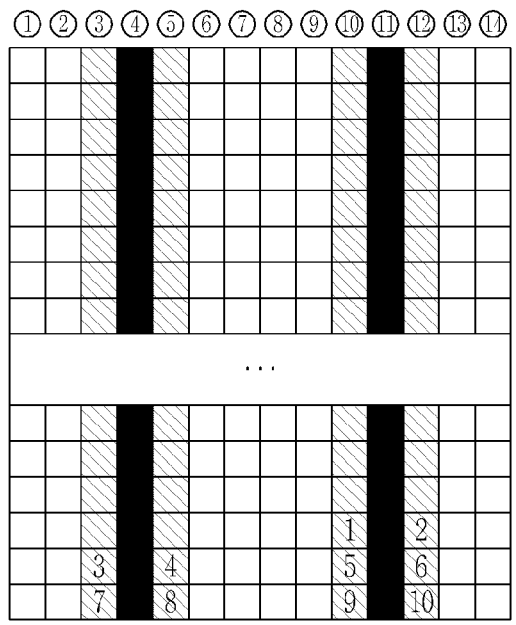
Figure 20B:
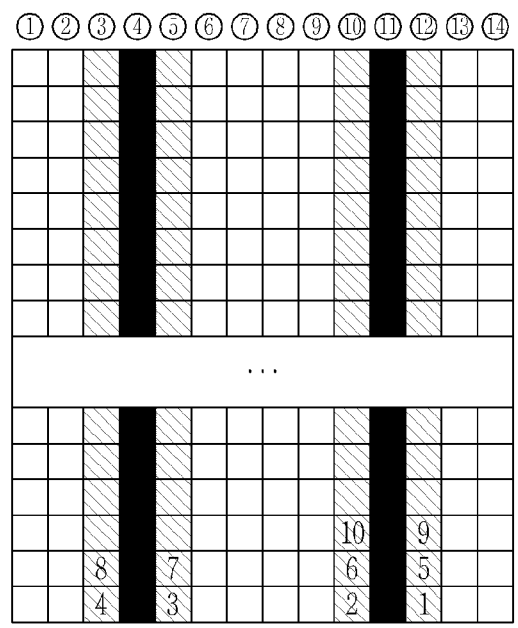
Figure 21A:
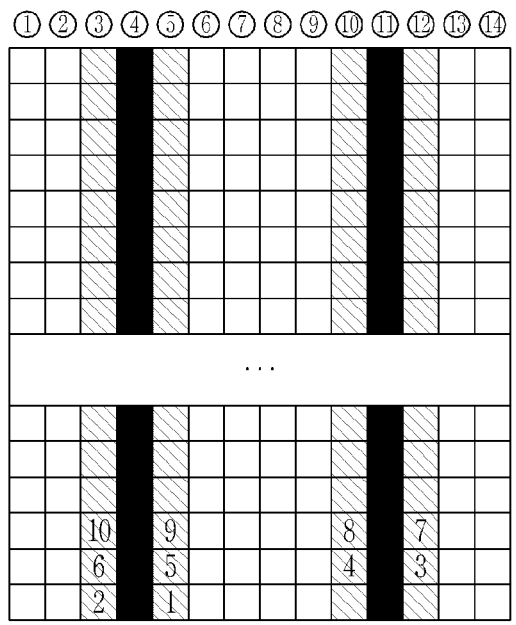
Figure 21B:
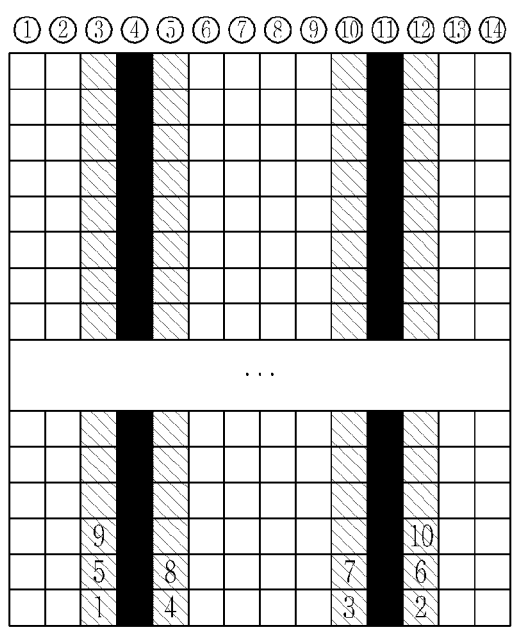

FIGS. 19a to 21b are views explaining in detail the methods of FIGS. 18a to 18f, and illustrate examples of applying the methods of FIGS. 18a to 18f to a set of resource elements having a matrix structure of R×C. FIGS. 19a and 19b correspond to FIGS. 18a and 18b, FIGS. 20a and 20b correspond to FIGS. 18c and 18d, and FIGS. 21a and 21b correspond to FIGS. 18e and 18f.

In FIGS. 2 to 21b, a relative relationship of a location to which the data information and the control information are mapped and a location to which an RS is mapped has been described using a set of physical resource elements including resource elements allocated for RS mapping. It will be understood that the above-described embodiments may be described using a structure of a time-frequency matrix excluding the resource elements allocated for RS mapping from the set of physical resource elements.

The data information and control information mapped to the set of physical resource elements in FIGS. 2 to 21b may be scrambled and modulation-mapped, and then may be input to a resource element mapper through a transform precoder as in a processing method of a PUSCH in 3GPP TS 36.211. Abbreviations used herein refer to abbreviations disclosed in 3GPP TS 36.212.

In the method of FIG. 13 according to the present invention, a method for applying an example of multiplexing CQI/PMI and RI, which are control information, with data information, to 3GPP TS 36.212 V8.2.0 will be described.

Hereinafter, $f_0, f_1, f_2, \ldots, f_{G-1}$ denotes input data, $q_0, q_1, q_2, \ldots, q_{Q-1}$ denotes input rank information (RI), and $g_0, g_1, g_2, \ldots, g_{H'-1}$ denotes a multiplexed output. Here, $H'=G'+Q'$ Multiplexing can be performed through the following steps.

1. Determine the number of symbols per subframe using the following equation:

$$N_{symb}^{PUSCH}=(2 \cdot (N_{symb}^{UL}-1)-N_{SRS})$$

Here, $N_{symb}^{PUSCH}$ denotes the number of SC-FDMA symbols which transmit a PUSCH in one subframe, $N_{symb}^{UL}$ denotes the number of symbols within one uplink slot, $N_{SRS}$ denotes the number of symbols used to transmit an SRS within one subframe.

2. Determine the number G' of modulation symbols of data information using the following equation:

$G'=G/Qm1$ (where $Qm1$ is a modulation order of data)

3. Determine the number Q' of modulation symbols of rank information using the following equation:

$Q'=Q/Qm2$ (where $Qm2$ is a modulation order of rank information)

4. Determine the number K of subcarriers occupied by modulation symbols of rank information using the following equation:

$K=\text{ceil}(Q'/\text{maximum number of resources for rank information})$

5. Determine the number of modulation symbols of rank information per symbol.

The number of modulation symbols of rank information per symbol is determined by a combination of 'floor' and 'ceil' in a symbol position occupied by each rank information based on Q' or by a method determined according to a remainder obtained by dividing the number of modulation symbols of rank information by the number of symbols. In this case, the modulation symbols may be equally divided to a maximum of two slots, and may be allocated from a front slot to a back slot or vice versa.

6. Multiplex the modulation symbols of the data information and the rank information.

Since the rank information should have a form stacked from the bottom of a subcarrier, the data information should be mapped by a time-priority scheme and the rank information should be mapped in a corresponding symbol. At this time, since the data information is mapped from the top subcarrier, the location of a subcarrier in which rank information can be located is determined by subtracting a result of the above step 2 from the entire number of subcarriers. Then the rank information is mapped in consideration of the number of symbols determined in the above step 3. This can be represented as a pseudo code as follows.

```
For (from 0-th subcarrier to last subcarrier) {
    If (current subcarrier number is less than value
obtained by subtracting K from entire number of subcarriers) {
        for (from SC-FDMA symbol 0 to number of SC-FDMA
symbols per subframe)
        {
            map data as output one symbol by one symbol
            increase SC-FDMA symbol count
            increase data symbol count
        }
    else {
        for (from SC-FDMA symbol 0 to the number of SC-FDMA
symbols per subframe)
        {
            if (number of modulation symbols of rank information in
corresponding SC-FDMA symbol calculated in the above step 4 is 0) {
                map data as output one symbol by one symbol
                increase SC-FDMA symbol count
                increase data symbol count
            }
            else {
                map rank information as output by one symbol by one symbol
                increase SC-FDMA symbol count
                increase rank information count
                delete number of modulation symbols of rank information in
corresponding SC-FDMA symbol calculated in the above step 4 by one
            }
        }
    }
    increase subcarrier count
}
```

A detailed method for locating rank information between data due to rate matching rather than puncturing may be modified entirely or partially.

Hereinafter, in the method of FIG. 13 according to the present invention, another method of applying an example of multiplexing CQI/PMI and RI, which are control information, with data information to 3GPP TS 36.212 V8.2.0 will be described.

It is assumed that the amount of RI does not intrude upon resources occupied by CQI/PMI (the number of subcarriers including symbols occupied by RI and the number of subcarriers occupied by CQI/PMI do not exceed the entire number of subcarriers per subframe for PUSCH transmission). Therefore, each of the RI, CQI/PMI, and data information should be considered to have a size which does not intrude upon each other. If the RI, CQI/PMI, and data information intrude upon one another, the RI may use a modified form of the following method by puncturing the CQI/PMI.

Here, $q_0, q_1, q_2, q_3, \ldots, q_{Q-1}$ denotes a CQI/PMI input, $f_0, f_1, f_2, f_3, \ldots, f_{G-1}$ denotes a data information input, $q_0^{RANK}, q_1^{RANK}, q_2^{RANK}, \ldots, q_{Q_{RANK}-1}^{RANK}$ (a coded bit) or $q_0^{RANK}, q_1^{RANK}, q_2^{RANK}, \ldots, q_{Q'_{RANK}-1}^{RANK}$ (vector sequence, a symbol form considering a modulation order) denotes an RI input, and $g_0, g_1, g_2, \ldots, g_{H'-1}$ denotes an output. If the RI is a coded bit, then $H=(G+Q+Q_{RANK})$ and $H'=H/Qm$. If the RI is a vector sequence, then $H'=H/Qm+Q'_{RANK}$.

$N_{symb}^{PUSCH}=(2 \cdot (N_{symb}^{UL}-1)-N_{SRS})$ denotes the number of symbols per subframe for PUSCH transmission, and $N_{sc}^{PUSCH}=H'/N_{symb}^{PUSCH}$ denotes the number of subcarriers carrying a PUSCH within one subframe.

The number of subcarriers used for rank information within one subcarrier can be expressed by two equations. Namely, if the RI is a coded bit, then $N_{sc}^{RANK}=\lceil(Q_{RANK}/Q_m)/$ 4]. Here, 4 is the maximum number of resources for the RI. A symbol such as ceil or floor need not be used when a result of division has no remainder. If the RI is a vector sequence, then $N_{sc}^{RANK} = \lceil Q'_{RANK}/4 \rceil$. Here, 4 is the maximum number of resources for the RI. A symbol such as ceil or floor need not be used when a result of division has no remainder.

The number of rank information encoded as a bit/vector sequence within the i-th symbol carrying a PUSCH within one subframe is expressed by ni.

The number of bit/vector sequences for the RI mapped to respective symbols carrying a PUSCH with respect to a subframe having a normal CP may refer to Table 10 to Table 12. Table 10 shows an ni value in a subframe having a normal CP. Table 11 shows an ni value in a subframe having an extended CP without an SRS. Table 12 shows an ni value in a subframe having an extended CP with an SRS in the last symbol.

TABLE 10

| i | 0 | 1 | 2 | 3 | 4 | 5 | 6 | 7 | 8 | 9 | 10 | 11 |
|---|---|---|---|---|---|---|---|---|---|---|---|---|
| | 0 | $\lfloor \lfloor Q_{RANK}/2 \rfloor/2 \rfloor$ or $\lfloor \lfloor Q'_{RANK}/2 \rfloor/2 \rfloor$ | 0 | 0 | $\lceil \lceil Q_{RANK}/2 \rceil/2 \rceil$ or $\lceil \lceil Q'_{RANK}/2 \rceil/2 \rceil$ | 0 | 0 | $\lceil \lfloor Q_{RANK}/2 \rfloor/2 \rceil$ or $\lceil \lfloor Q'_{RANK}/2 \rfloor/2 \rceil$ | 0 | 0 | $\lfloor \lceil Q_{RANK}/2 \rceil/2 \rfloor$ or $\lfloor \lceil Q'_{RANK}/2 \rceil/2 \rfloor$ | 0 |

Table 10 serves to evenly use symbols in which two slots and RI are located using ceil/floor down/modulo or a position priority of symbols in which the RI is located. That is, the number of sequences may be different by about 1 by various combinations of i of 1>4>7>10, 1>7>4>10, or 4>7>1>10 and Table 10 may be changed accordingly. Although two cases of $Q_{RANK}$ and $Q'_{RANK}$ have been described, an equation using $Q_{RANK}$ may be used if the Ri is a coded bit and an equation using $Q'_{RANK}$ may be used if the Ri is a vector sequence.

TABLE 11

| i | 0 | 1 | 2 | 3 | 4 | 5 | 6 | 7 | 8 | 9 |
|---|---|---|---|---|---|---|---|---|---|---|
| | 0 | $\lfloor \lfloor Q_{RANK}/2 \rfloor/2 \rfloor$ or $\lfloor \lfloor Q'_{RANK}/2 \rfloor/2 \rfloor$ | 0 | 0 | $\lceil \lceil Q_{RANK}/2 \rceil/2 \rceil$ or $\lceil \lceil Q'_{RANK}/2 \rceil/2 \rceil$ | 0 | $\lceil \lfloor Q_{RANK}/2 \rfloor/2 \rceil$ or $\lceil \lfloor Q'_{RANK}/2 \rfloor/2 \rceil$ | 0 | 0 | $\lfloor \lceil Q_{RANK}/2 \rceil/2 \rfloor$ or $\lfloor \lceil Q'_{RANK}/2 \rceil/2 \rfloor$ |

Table 11 serves to evenly use symbols in which two slots and RI are located using ceil/floor/modulo or a position priority of symbols in which the RI is located. That is, the number of sequences may be different by about 1 by various combinations of i of 1>4>6>9, 1>6>4>9, or 4>6>1>9 and Table 11 may be changed accordingly. Although two cases of $Q_{RANK}$ and $Q'_{RANK}$ have been described, an equation using $Q_{RANK}$ may be used if the Ri is a coded bit and an equation using $Q'_{RANK}$ may be used if the Ri is a vector sequence.

TABLE 12

| i | 0 | 1 | 2 | 3 | 4 | 5 | 6 | 7 | 8 |
|---|---|---|---|---|---|---|---|---|---|
| | 0 | $\lfloor \lfloor Q_{RANK}/2 \rfloor/2 \rfloor$ or $\lfloor \lfloor Q'_{RANK}/2 \rfloor/2 \rfloor$ | 0 | 0 | $\lceil \lceil Q_{RANK}/2 \rceil/2 \rceil$ or $\lceil \lceil Q'_{RANK}/2 \rceil/2 \rceil$ | $\lfloor \lfloor Q_{RANK}/2 \rfloor/2 \rfloor$ or $\lfloor \lfloor Q'_{RANK}/2 \rfloor/2 \rfloor$ | $\lceil \lfloor Q_{RANK}/2 \rfloor/2 \rceil$ or $\lceil \lfloor Q'_{RANK}/2 \rfloor/2 \rceil$ | 0 | 0 |

Table 12 serves to use symbols in which two slots and RI are located using ceil/floor/modulo or a position priority of symbols in which the RI is located. That is, the number of sequences may be different by about 1 by various combinations of i of 1>4>6>5, 1>6>5>4, or 4>6>1>5 and Table 12 may be changed accordingly. Although two cases of $Q_{RANK}$ and $Q'_{RANK}$ have been described, an equation using $Q_{RANK}$ may be used if the Ri is a coded bit and an equation using $Q'_{RANK}$ may be used if the Ri is a vector sequence.

Control information, rank information, and data information may be multiplexed as follows.

```
set i, j, k, l, m to 0
while l < H'-N_sc^RANK
    if j < Q -- CQI/PMI
        g_k = [q_j ... q_{j+Q_m-1}]^T
        j = j + Q_m
    else -- data
        g_k = [f_i ... f_{i+Q_m-1}]^T
        i = i + Q_m
    end if
    k = k + 1
    l = l + 1
end while
```

-continued

```
while l < H'
    if n_{l mod N_symb^PUSCH} > 0 -- RANK
        g_k = [q_m^RANK ... q_{m+Q_m-1}^RANK]^T
        m = m + Q_m
        n_{l mod N_symb^PUSCH} = n_{l mod N_symb^PUSCH} - Q_m
    else -- data
```

-continued

```
        g_k = [f_i ... f_{i+Q_m-1}]^T
        i = i + Q_m
    end if
    k = k + 1
    l = l + 1
end while
```

If RI is a coded bit, $g_k = [q_m^{RANK} \ldots q_{m+Q_m-1}^{RANK}]^T$, m=m+$Q_m$, and $n_{l\ mod\ N_{symb}}^{PUSCH} = n_{l\ mod\ N_{symb}}^{PUSCH} - Q_m$ may be used, and if the RI is a vector sequence, $g_k = q_m^{RANK}$, m=m+1, and $n_{l\ mod\ N_{symb}}^{PUSCH} = n_{l\ mod\ N_{symb}}^{PUSCH} - 1$ may be used.

In the method of FIG. 13 according to the present invention, another method for applying an example of multiplexing CQI/PMI and RI, which are control information, with data information, to 3GPP TS 36.212 V8.2.0 will be described.

Figure 22:
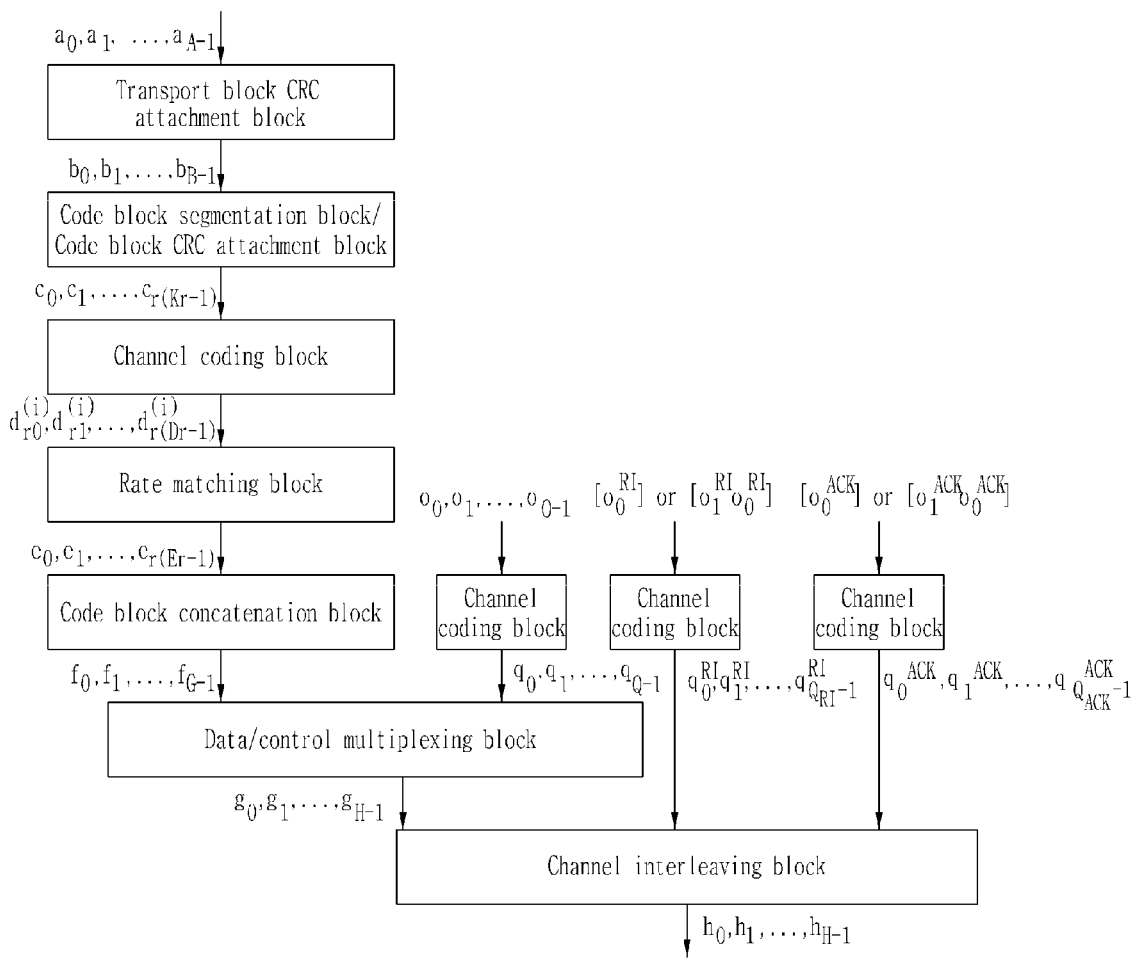
FIG. 22 illustrates a processing structure for a UL-SCH transport channel according to an exemplary embodiment of the present invention.

FIG. 22 illustrates a processing structure for a UL-SCH transport channel according to an exemplary embodiment of the present invention. Data is input to a coding unit with a maximum of one transport block every TTI. Referring to FIG. 22, processes for attaching CRC to the transport block, segmenting a code block and attaching CRC to the segmented code block, channel-coding data information and control information, performing rate matching, concatenating the code block, multiplexing the data information and control information, and performing channel interleaving are carried out.

Hereinafter, the process for attaching CRC to a transport block is described. Error detection is provided on UL-SCH transport blocks through a Cyclic Redundancy Check (CRC).

The entire transport block is used to calculate the CRC parity bits. Denote the bits in a transport block delivered to layer 1 by $a_0, a_1, a_2, a_3, \ldots, a_{A-1}$ and the parity bits by $p_0, p_1, p_2, p_3, \ldots, p_{L-1}$. A is the size of the transport block and L is the number of parity bits.

The parity bits are computed and attached to the UL-SCH transport block according to subclause 5.1.1 setting L to 24 bits and using the generator polynomial $g_{CRC24A}(D)$.

The process for segmenting a code block and attaching CRC to the segmented code block will now be described. The bits input to the code block segmentation are denoted by $b_0, b_1, b_2, b_3, \ldots, b_{B-1}$ where B is the number of bits in the transport block (including CRC).

Code block segmentation and code block CRC attachment are performed according to subclause 5.1.2.

The bits after code block segmentation are denoted by $c_{r0}, c_{r1}, c_{r2}, c_{r3}, \ldots, c_{r(K_r-1)}$, where r is the code block number and $K_r$ is the number of bits for code block number r.

Channel coding for a UL-SCH will now be described. Code blocks are delivered to the channel coding block. The bits in a code block are denoted by $c_{r0}, c_{r1}, c_{r2}, c_{r3}, \ldots, c_{r(K_r-1)}$, where r is the code block number, and $K_r$ is the number of bits in code block number r. The total number of code blocks is denoted by C and each code block is individually turbo encoded according to subclause 5.1.3.2.

After encoding the bits are denoted by $d_{r0}^{(i)}, d_{r1}^{(i)}, d_{r2}^{(i)}, d_{r3}^{(i)}, \ldots, d_{r(D_r-1)}^{(i)}$, with i=0, 1, and 2 and where $D_r$ is the number of bits on the i-th coded stream for code block number r, i.e. $D_r = K_r + 4$.

Hereinafter, rate matching is described. Turbo coded blocks are delivered to the rate matching block. They are denoted by $d_{r0}^{(i)}, d_{r1}^{(i)}, d_{r2}^{(i)}, d_{r3}^{(i)}, \ldots, d_{r(D_r-1)}^{(i)}$, with i=0, 1, and 2, and where r is the code block number, i is the coded stream index, and $D_r$ is the number of bits in each coded stream of code block number r. The total number of code blocks is denoted by C and each coded block is individually rate matched according to subclause 5.1.4.1.

After rate matching, the bits are denoted by $e_{r0}, e_{r1}, e_{r2}, e_{r3}, \ldots, e_{r(E_r-1)}$, where r is the coded block number, and where $E_r$ is the number of rate matched bits for code block number r.

Hereinafter, code block concatenation is described. The bits input to the code block concatenation block are denoted by $e_{r0}, e_{r1}, e_{r2}, e_{r3}, \ldots, e_{r(E_r-1)}$ for $r=0, \ldots, C-1$ and where $E_r$ is the number of rate matched bits for the r-th code block.

Code block concatenation is performed according to subclause 5.1.5.

The bits after code block concatenation are denoted by $f_0, f_1, f_2, f_3, \ldots f_{G-1}$, where G is the total number of coded bits for transmission excluding the bits used for control transmission, when control information is multiplexed with the UL-SCH transmission.

Hereinafter, channel coding for control information is described. Control data arrives at the coding unit in the form of channel quality information (CQI and/or PMI), HARQ-ACK and rank indication. Different coding rates for the control information are achieved by allocating different number of coded symbols for its transmission. When control data are transmitted in the PUSCH, the channel coding for HARQ-ACK, rank indication and channel quality information $o_0, o_1, o_2, \ldots, o_{O-1}$ is done independently.

If HARQ-ACK consists of 1-bit of information, i.e., $[o_0^{ACK}]$, it is first encoded according to Table 5.2.2-1.

If HARQ-ACK consists of 2-bits of information, i.e., $[o_1^{ACK} o_0^{ACK}]$, it is first encoded according to Table 5.2.2-2.

TABLE 13

| $Q_m$ | Encoded HARQ-ACK |
|---|---|
| 2 | $[o_0^{ACK} X]$ |
| 4 | $[o_0^{ACK} X X X]$ |
| 6 | $[o_0^{ACK} X X X X X]$ |

TABLE 14

| $Q_m$ | Encoded HARQ-ACK |
|---|---|
| 2 | $[o_1^{ACK} o_0^{ACK}]$ |
| 4 | $[o_1^{ACK} o_0^{ACK} X X]$ |
| 6 | $[o_1^{ACK} o_0^{ACK} X X X X]$ |

[Note from the editor: the 'x' above is a placeholder for 211 to treat bits with this value differently when performing scrambling of coded bits. This will enable limiting the constellation size used for ACK transmission in PUSCH to QPSK.

The bit sequence $q_0^{ACK}, q_1^{ACK}, q_2^{ACK}, \ldots, q_{Q_{ACK}-1}^{ACK}$ is obtained by concatenation of multiple encoded HARQ-ACK blocks where $Q_{ACK}$ is the total number of coded bit for all the encoded HARQ-ACK blocks. The vector sequence output of the channel coding for HARQ-ACK information is denoted by $\underline{q}_0^{ACK}, \underline{q}_1^{ACK}, \ldots, \underline{q}_{Q'_{ACK}-1}^{ACK}$, where $Q'_{ACK} = Q_{ACK}/Q_m$, and is obtained as follows:

```
Set i ,k to 0
while i < Q_ACK
    q_k^ACK = [q_i^ACK ... q_{i+Q_m-1}^ACK]^T
    i = i + Q_m
    k = k + 1
end while
```

For rank indication (RI)

If RI consists of 1-bit of information, i.e., $[o_0^{RI}]$, it is first encoded according to Table 5.2.2-3.

If RI consists of 2-bits of information, i.e., $[o_0^{RI} o_1^{RI}]$, it is first encoded according to Table 5.2.2-4 where $o_2^{RI} = (o_0^{RI} + o_1^{RI}) \bmod 2$.

TABLE 15

| $Q_m$ | Encoded RI |
|---|---|
| 2 | $[o_0^{RI} X]$ |
| 4 | $[o_0^{RI} X X X]$ |
| 6 | $[o_0^{RI} X X X X X]$ |

TABLE 16

| $Q_m$ | Encoded RI |
|---|---|
| 2 | $[o_0^{RI} \, o_1^{RI} \, o_2^{RI} \, o_0^{RI} \, o_1^{RI} \, o_2^{RI}]$ |
| 4 | $[o_0^{RI} \, o_1^{RI} \, x \, x \, o_2^{RI} \, o_0^{RI} \, x \, x \, o_1^{RI} \, o_2^{RI} \, x \, x]$ |
| 6 | $[o_0^{RI} \, o_1^{RI} \, x \, x \, x \, x \, o_2^{RI} \, o_0^{RI} \, x \, x \, x \, x \, o_1^{RI} \, o_2^{RI} \, x \, x \, x \, x]$ |

The "x" in Table 15 and 16 are placeholders for 3GPP TS 36.211 to scramble the RI bits in a way that maximizes the Euclidean distance of the modulation symbols carrying rank information.

The bit sequence $q_0^{RI}, q_1^{RI}, q_2^{RI}, \ldots q_{Q_{RI}-1}$ is obtained by concatenation of multiple encoded RI blocks where $Q_{RI}$ is the total number of coded bit for all the encoded RI blocks. The last concatenation of the encoded RI block may be partial so that the total bit sequence length is equal to $Q_{RI}$. The vector sequence output of the channel coding for rank information is denoted by $\underline{q}_0^{RI}, \underline{q}_1^{RI}, \ldots, \underline{q}_{Q'_{RI}-1}^{RI}$, where $Q'_{RI} = Q_{RI}/Q_m$, and is obtained as follows:

```
Set i, k to 0
while i < Q_RI
    q_k^RI = [q_i^RI ... q_{i+Q_m-1}^RI]^T
    i = i + Q_m
    k = k + 1
end while
```

For channel quality control information (CQI and/or PMI)
If the payload size is less than or equal to 11 bits, the channel coding of the channel quality information is performed according to subclause 5.2.3.3 of 3GPP TS 36.212 with input sequence $o_0, o_1, o_2, \ldots, o_{O-1}$.

For payload sizes greater than 11 bits, the channel coding and rate matching of the channel quality information is performed according to subclause 5.1.3.1 and 5.1.4.2 of 3GPP TS 36.212 with input sequence $o_0, o_1, o_2, \ldots, o_{O-1}$.

The output sequence for the channel coding of channel quality information is denoted by $q_0, q_1, q_2, q_3, \ldots, q_{Q-1}$.

The control and data multiplexing is performed such that HARQ-ACK information is present on both slots and is mapped to resources around the demodulation reference signals. In addition, the multiplexing ensures that control and data information are mapped to different modulation symbols.

The inputs to the data and control multiplexing are the coded bits of the control information denoted by $q_0, q_1, q_2, q_3, \ldots, q_{Q-1}$ and the coded bits of the UL-SCH denoted by $f_0, f_1, f_2, f_3, \ldots, f_{G-1}$. The output of the data and control multiplexing operation is denoted by $g_0, g_1, g_2, g_3, \ldots, g_{H'-1}$, where $H=(G+Q)$ and $H'=H/Q_m$, and where $g_i$, $i=0, \ldots, H'-1$ are column vectors of length $Q_m$. H is the total number of coded bits allocated for UL-SCH data and CQI/PMI data.

Denote the number of SC-FDMA symbols per subframe for PUSCH transmission by $N_{symb}^{PUSCH} = (2 \cdot (N_{symb}^{UL} - 1) - N_{SRS})$.

The control information and the data shall be multiplexed as follows:

```
Set i, j, k to 0
while j < Q -- first place the control information
    g_k = [q_j ... q_{j+Q_m-1}]^T
    j = j + Q_m
    k = k + 1
end while
while i < G -- then place the data
    g_k = [f_i ... f_{i+Q_m-1}]^T
    i = i + Q_m
    k = k + 1
end while
```

Hereinafter, channel interleaver is described.

The channel interleaver described in this subclause in conjunction with the resource element mapping for PUSCH in 3GPP TS 36.211 implements a time-first mapping of modulation symbols onto the transmit waveform while ensuring that the HARQ-ACK information is present on both slots in the subframe and is mapped to resources around the uplink demodulation reference signals.

The input to the channel interleaver are denoted by $\underline{g}_0, \underline{g}_1, \underline{g}_2, \ldots \underline{g}_{H'-1}, \underline{q}_0^{RI}, \underline{q}_1^{RI}, \underline{q}_2^{RI}, \ldots \underline{q}_{Q'_{RI}-1}^{RI}$ and $\underline{q}_0^{ACK}, \underline{q}_1^{ACK}, \underline{q}_2^{ACK}, \ldots, \underline{q}_{Q'_{ACK}-1}^{ACK}$. The number of modulation symbols in the subframe is given by $H'' = H' + Q'_{RI}$. The output bit sequence from the channel interleaver is derived as follows:

(1) Assign $C_{mux} = N_{symb}^{PUSCH}$ to be the number of columns of the matrix. The columns of the matrix are numbered 0, 1, 2, …, $C_{mux} - 1$ from left to right.

(2) The number of rows of the matrix is $R_{mux} = (H'' \cdot Q_m)/C_{mux}$ and we define $R'_{mux} = R_{mux}/Q_m$.

The rows of the rectangular matrix are numbered 0, 1, 2, …, $R_{mux} - 1$ from top to bottom.

(3) If rank information is transmitted in this subframe, the vector sequence $\underline{q}_0^{RI}, \underline{q}_1^{RI}, \underline{q}_2^{RI}, \ldots, \underline{q}_{Q'_{RI}-1}^{RI}$ is written onto the columns indicated by Table 5.2.2.8-1, and by sets of $Q_m$ rows starting from the last row and moving upwards according to the following pseudocode.

```
Set i, j to 0.
Set r to R'_mux - 1
    while i < Q'_RI
        c_RI = Column Set(j)
        y_{r×C_mux + c_RI} = q_i^RI
        i = i + 1
        r = R'_mux - 1 - ⌊i/4⌋
        j = (j + 3) mod 4
    end while
```

(4) Write the input vector sequence, i.e., $\underline{y}_k = \underline{g}_k$ for $k = 0, 1, \ldots, H'-1$, into the ($R_{mux} \times C_{mux}$) matrix by sets of $Q_m$ rows starting with the vector $\underline{y}_0$ in column 0 and rows 0 to ($Q_m - 1$) and skipping the matrix entries that are already occupied:

$$\begin{bmatrix} \underline{y}_0 & \underline{y}_1 & \underline{y}_2 & \cdots & \underline{y}_{C_{max}-1} \\ \underline{y}_{C_{max}} & \underline{y}_{C_{max}+1} & \underline{y}_{C_{max}+2} & \cdots & \underline{y}_{2C_{max}-1} \\ \vdots & \vdots & \vdots & \ddots & \vdots \\ \underline{y}_{(R'_{max}-1) \times C_{max}-1} & \underline{y}_{(R'_{max}-1) \times C_{max}+1} & \underline{y}_{(R'_{max}-1) \times C_{max}+2} & \cdots & \underline{y}_{(R'_{max} \times C_{max}-1)} \end{bmatrix}$$

(5) If HARQ-ACK information is transmitted in this subframe, the vector sequence $q_0^{ACK}$, $q_1^{ACK}$, $q_2^{ACK}$, ..., $q_{Q'_{ACK}-1}^{ACK}$ is written onto the columns indicated by Table 18, and by sets of $Q_m$ rows starting from the last row and moving upwards. Note that this operation overwrites some of the channel interleaver entries obtained in step (4).

(6) The output of the block interleaver is the bit sequence read out column by column from the $(R_{mux} \times C_{mux})$ matrix. The bits after channel interleaving are denoted by $h_0$, $h_1$, $h_2$, ..., $h_{H+Q_{RI}-1}$.

TABLE 17

| CP configuration | Column Set |
|---|---|
| Normal | {1, 4, 7, 10} |
| Extended | {0, 3, 5, 8} |

TABLE 18

| CP configuration | Column Set |
|---|---|
| Normal | {2, 3, 8, 9} |
| Extended | {1, 2, 6, 7} |

Although the above-described exemplary embodiments of the present invention may be used to a UL-SCH of 3GPP, it should be noted that the present invention is not limited thereto.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention may be applied to a user equipment, a base station, and other devices of a wireless mobile communication system.

What is claimed is:

1. A method of transmitting an uplink signal in a wireless communication system, the method comprising:
   transmitting the uplink signal via plural Single Carrier Frequency Division Multiple Access (SC-FDMA) symbols in a subframe, the uplink signal includes rank information (RI) and Hybrid Automatic Repeat reQuest Acknowledgement (HARQ-ACK) information,
   wherein the plural SC-FDMA symbols include an SC-FDMA symbol for reference signal, a set of two SC-FDMA symbols for the RI, and a set of two SC-FDMA symbols for the HARQ-ACK information,
   wherein the set of two SC-FDMA symbols for the RI are separated from the SC-FDMA symbol for the reference signal by one SC-FDMA symbol,
   wherein the set of two SC-FDMA symbols for the HARQ-ACK information are contiguous with the SC-FDMA symbol for the reference signal.

2. The method of claim 1, wherein the subframe includes a slot, the slot including seven SC-FDMA symbols when a normal cyclic prefix is configured.

3. The method of claim 2, wherein the SC-FDMA symbol for the reference signal is $4^{th}$ SC-FDMA symbol in the slot.

4. The method of claim 3, wherein the set of two SC-FDMA symbols for the RI are $2^{nd}$ and $6^{th}$ SC-FDMA symbols in the slot.

5. The method of claim 3, wherein the set of two SC-FDMA symbols for the HARQ-ACK information are $3^{rd}$ and $5^{th}$ SC-FDMA symbols in the slot.

6. The method of claim 1, wherein the subframe includes a slot, the slot including six SC-FDMA symbols when an extended cyclic prefix is configured.

7. The method of claim 6, wherein the SC-FDMA symbol for the reference signal is $3^{rd}$ SC-FDMA symbol in the slot.

8. The method of claim 6, wherein the set of two SC-FDMA symbols for the RI are $1^{st}$ and $5^{th}$ SC-FDMA symbols in the slot.

9. The method of claim 6, wherein the set of two SC-FDMA symbols for the HARQ-ACK information are $2^{nd}$ and $4^{th}$ SC-FDMA symbols in the slot.

10. The method of claim 1, wherein the uplink signal is a Physical Uplink Shared Channel (PUSCH) signal, the PUSCH signal including an uplink shared channel (UL-SCH) data.

11. An apparatus for use in a wireless communication system, the apparatus comprising:
    a module for mapping rank information (RI) and Hybrid Automatic Repeat reQuest Acknowledgement (HARQ-ACK) information to resources of plural Single Carrier Frequency Division Multiple Access (SC-FDMA) symbols in a subframe; and
    a module for transmitting an uplink signal via the plural SC-FDMA symbols in the subframe, the uplink signal including the RI and the HARQ-ACK information,
    wherein the plural SC-FDMA symbols include an SC-FDMA symbol for reference signal, a set of two SC-FDMA symbols for the RI, and a set of two SC-FDMA symbols for the HARQ-ACK information,
    wherein the set of two SC-FDMA symbols for the RI are separated from the SC-FDMA symbol for the reference signal by one SC-FDMA symbol, wherein the set of two SC-FDMA symbols for the HARQ-ACK information are contiguous with the SC-FDMA symbol for the reference signal.

12. The apparatus of claim 11, wherein the subframe includes a slot, the slot including seven SC-FDMA symbols when a normal cyclic prefix is configured.

13. The apparatus of claim 12, wherein the SC-FDMA symbol for the reference signal is $4^{th}$ SC-FDMA symbol in the slot.

14. The apparatus of claim 13, wherein the set of two SC-FDMA symbols for the RI are $2^{nd}$ and $6^{th}$ SC-FDMA symbols in the slot.

15. The apparatus of claim 13, wherein the set of two SC-FDMA symbols for the HARQ-ACK information are $3^{rd}$ and $5^{th}$ SC-FDMA symbols in the slot.

16. The apparatus of claim 11, wherein the subframe includes a slot, the slot including six SC-FDMA symbols when an extended cyclic prefix is configured.

17. The apparatus of claim 16, wherein the SC-FDMA symbol for the reference signal is $3^{rd}$ SC-FDMA symbol in the slot.

18. The apparatus of claim 16, wherein the set of two SC-FDMA symbols for the RI are $1^{st}$ and $5^{th}$ SC-FDMA symbols in the slot.

19. The apparatus of claim 16, wherein the set of two SC-FDMA symbols for the HARQ-ACK information are $2^{nd}$ and $4^{th}$ SC-FDMA symbols in the slot.

20. The apparatus of claim 11, wherein the uplink signal is a Physical Uplink Shared Channel (PUSCH) signal, the PUSCH signal including an uplink shared channel (UL-SCH) data.

* * * * *